(12) United States Patent
Fujishima

(10) Patent No.: US 12,397,902 B2
(45) Date of Patent: Aug. 26, 2025

(54) CONTROL DEVICE OF ELECTRIC DRIVE SYSTEM, ELECTRIC DRIVE SYSTEM AND ELECTRIC AIRCRAFT

(71) Applicant: DENSO CORPORATION, Kariya (JP)

(72) Inventor: Yuuya Fujishima, Kariya (JP)

(73) Assignee: DENSO CORPORATION, Kariya (JP)

( * ) Notice: Subject to any disclaimer, the term of this patent is extended or adjusted under 35 U.S.C. 154(b) by 323 days.

(21) Appl. No.: 17/730,660

(22) Filed: Apr. 27, 2022

(65) Prior Publication Data

US 2022/0258869 A1  Aug. 18, 2022

Related U.S. Application Data

(63) Continuation of application No. PCT/JP2020/041845, filed on Nov. 10, 2020.

(30) Foreign Application Priority Data

Nov. 21, 2019 (JP) .................. 2019-210176

(51) Int. Cl.
| | | |
|---|---|---|
| *B64U 50/19* | (2023.01) | |
| *B64C 29/00* | (2006.01) | |
| *B64D 27/24* | (2024.01) | |
| *B64D 31/06* | (2024.01) | |
| *B64U 10/20* | (2023.01) | |

(Continued)

(52) U.S. Cl.
CPC ............. *B64D 27/24* (2013.01); *B64D 31/06* (2013.01); *B64U 10/20* (2023.01); *B64U 50/13* (2023.01); *B64U 50/19* (2023.01); *B64C 29/0033* (2013.01); *B64U 30/297* (2023.01)

(58) Field of Classification Search
CPC ........ B64D 27/24; B64D 31/06; B64U 10/20; B64U 50/13; B64U 50/19; B64U 30/297; B64U 50/14; B64C 29/0033; B64C 11/46; B64C 29/00
USPC ............................................ 440/49
See application file for complete search history.

(56) References Cited

U.S. PATENT DOCUMENTS

| | | | | |
|---|---|---|---|---|
| 1,491,512 A | * | 4/1924 | Bracco | ..... B63H 1/22 440/49 |
| 5,994,962 A | | 11/1999 | Watanabe et al. | |
| 6,288,509 B1 | | 9/2001 | Amagasa | |

(Continued)

FOREIGN PATENT DOCUMENTS

| | | | | |
|---|---|---|---|---|
| EP | 3623288 A1 | * | 3/2020 | ............. B64C 11/00 |
| JP | H11-267791 A | | 10/1999 | |

(Continued)

OTHER PUBLICATIONS

SRPaero, "Replacing a VTOL Propeller", srp.aero, 2019 (Year: 2019).*

(Continued)

*Primary Examiner* — Tiffany P Young
*Assistant Examiner* — Shien Ming Chou
(74) *Attorney, Agent, or Firm* — Oliff PLC

(57) ABSTRACT

A control device of an electric drive system for rotationally driving one of a rotary blade and a screw that are a rotating body. The control device has an angle acquisition unit configured to acquire an angle of the rotating body, and a lock control unit configured to lock a rotation of the rotating body within a set lock angle range based on the acquired angle by the angle acquisition unit.

5 Claims, 16 Drawing Sheets

(51) Int. Cl.
  *B64U 30/297*  (2023.01)
  *B64U 50/13*  (2023.01)

(56) References Cited

U.S. PATENT DOCUMENTS

| | | | | |
|---|---|---|---|---|
| 6,622,962 | B1* | 9/2003 | White | B64C 27/26 |
| | | | | 244/12.3 |
| 10,053,213 | B1 | 8/2018 | Tu | |
| 2004/0112053 | A1* | 6/2004 | Yamada | F02B 39/16 |
| | | | | 60/602 |
| 2006/0125439 | A1 | 6/2006 | Ajima et al. | |
| 2009/0119865 | A1 | 5/2009 | Amagasa et al. | |
| 2010/0286870 | A1 | 11/2010 | Endo et al. | |
| 2014/0225538 | A1* | 8/2014 | Omata | H02P 21/34 |
| | | | | 318/400.02 |
| 2016/0094168 | A1 | 3/2016 | Maekawa et al. | |
| 2016/0116304 | A1 | 4/2016 | Iwamoto et al. | |
| 2016/0207625 | A1 | 7/2016 | Judas et al. | |
| 2016/0244157 | A1 | 8/2016 | Welsh | |
| 2017/0101175 | A1 | 4/2017 | Welsh | |
| 2017/0137142 | A1 | 5/2017 | Firanski et al. | |
| 2017/0166302 | A1 | 6/2017 | Shiosaki | |
| 2018/0086445 | A1* | 3/2018 | Combs | B64C 3/44 |
| 2018/0229606 | A1 | 8/2018 | Vondrell et al. | |
| 2019/0127056 | A1 | 5/2019 | Weekes et al. | |
| 2019/0127061 | A1 | 5/2019 | McLaren et al. | |
| 2019/0340937 | A1* | 11/2019 | Villa | G05D 1/0202 |
| 2020/0010184 | A1 | 1/2020 | Welsh | |

FOREIGN PATENT DOCUMENTS

| | | | | |
|---|---|---|---|---|
| JP | | 2011-162173 A | 8/2011 | |
| JP | | 5909939 B2 | 4/2016 | |
| WO | WO-2020006659 A1 * | | 1/2020 | H02K 29/08 |

OTHER PUBLICATIONS

CTIA Research Team, "Up, Up and Away: How Do Drones Works?", www.ctia.org (Year: 2019).*
Mikets, "How to tie two motors together using encoders in TELEOP?" First Tech Challenge, ftc.forum.firstinspires.org. 2016 (Year: 2016).*
Sony, What is the purpose for Last Known Good Configuration function and how to enable it? (Year: 2018).*
"Brushless DC Gear Motor Stopping Accuracy", Feb. 4, 2018, https://web.archive.org/web/20180204142934/, Retrieved Mar. 4, 2025.

* cited by examiner

ROTATION ANGLE OF ROTARY BLADE : MECHANICAL ANGLE : ELECTRIC ANGLE = 3 : 12 : 32

ROTATION ANGLE OF ROTARY BLADE : MECHANICAL ANGLE : ELECTRIC ANGLE = 8 : 3 : 12 ially driving the rotary blades, and the lift and thrust of an airframe can be obtained by rotationally driving the multiple rotary blades by multiple motors.

CONTROL DEVICE OF ELECTRIC DRIVE SYSTEM, ELECTRIC DRIVE SYSTEM AND ELECTRIC AIRCRAFT

CROSS REFERENCE TO RELATED APPLICATIONS

This application is a continuation application of International Patent Application No. PCT/JP2020/041845 filed on Nov. 10, 2020, which designated the U.S. and based on and claims the benefits of priority of Japanese Patent Application No. 2019-210176 filed on Nov. 21, 2019. The entire disclosure of all of the above applications is incorporated herein by reference.

TECHNICAL FIELD

The present disclosure relates to a control device of an electric drive system.

BACKGROUND

In recent years, a development of manned or unmanned electric aircraft called electric vertical take-off and landing aircraft (eVTOL) has become active as a type of aircraft different from airplanes having a gas turbine engine.

SUMMARY

A technique capable of locking a rotary blade or a screw as a rotating body in a specific angle range is desired.

The present disclosure can be realized as the following embodiments.

According to one embodiment of the present disclosure, a control device of an electric drive system is provided. This control device is a control device of an electric drive system for rotationally driving one of the rotary blades and the screw, and includes a lock control unit configured to lock a rotation of the rotating body within a set lock angle range.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
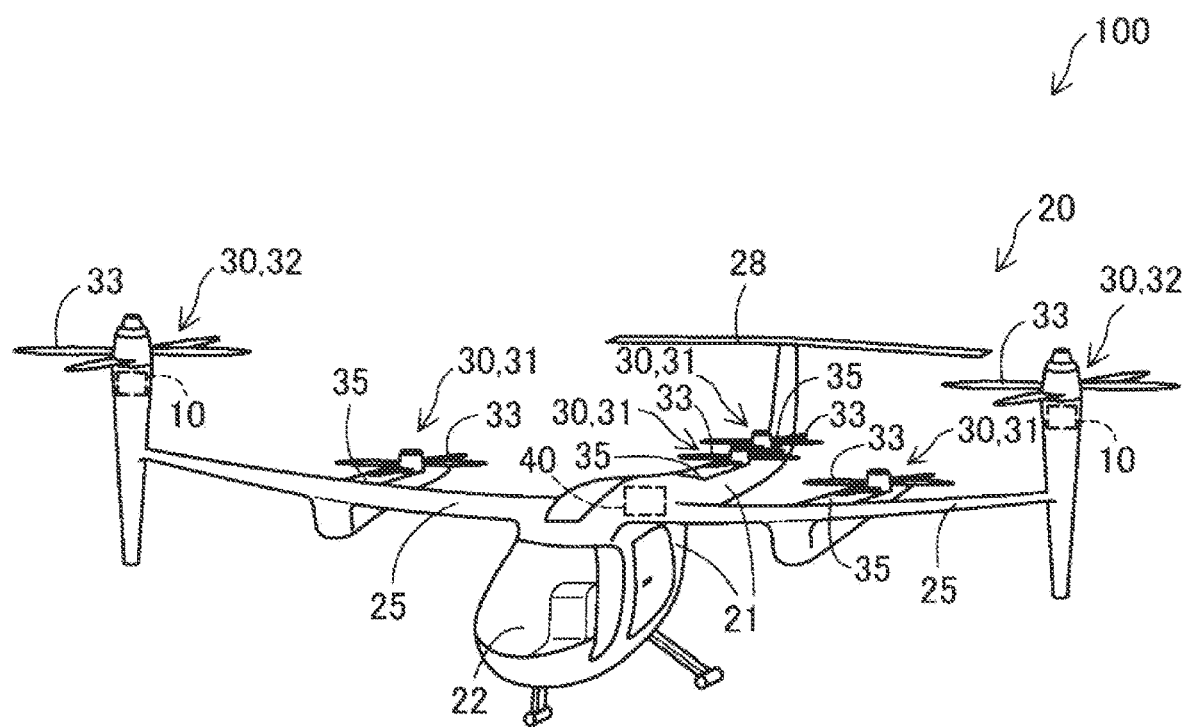
FIG. 1 is a perspective view showing an external configuration of an electric vertical take-off and landing aircraft equipped with a control device of an electric drive system.

In recent years, a development of manned or unmanned electric aircraft called electric vertical take-off and landing aircraft (eVTOL) has become active as a type of aircraft different from airplanes having a gas turbine engine. The electric vertical take-off and landing aircraft is equipped with a plurality of electric drive systems (EDS) for rotationally driving the rotary blades, and the lift and thrust of an airframe can be obtained by rotationally driving the multiple rotary blades by multiple motors.

In the electric vertical take-off and landing aircraft, some rotary blades may not be used and may not rotate depending on flight conditions and the like. A discloser of the present application has found that there are situations in which a non-rotating rotor is desired to be locked in a specific angle range in order to achieve a predetermined purpose. The discloser of the present application assumes for the predetermined purposes that, for example, to accommodate a non-rotating rotary blade in an accommodating portion provided in the electric vertical take-off and landing aircraft, to suppress a deterioration of efficiency due to an air resistance of the non-rotating rotary blades, and to suppress an occurrence of problems caused by an idle rotation of the rotary blades, etc. The above-mentioned situations are common not only in the electric drive system mounted on the electric aircraft such as an electric vertical take-off and landing machine, but also in an electric drive system mounted on a ship or the like for rotationally driving a screw. Therefore, a technique capable of locking a rotary blade or a screw as a rotating body in the specific angle range is desired.

The present disclosure can be realized as the following embodiments.

According to one embodiment of the present disclosure, a control device of an electric drive system is provided. This control device is a control device of an electric drive system for rotationally driving one of the rotary blades and the screw, and includes a lock control unit configured to lock a rotation of the rotating body within a set lock angle range.

According to the control device of the electric drive system of this embodiment, since the lock control unit for locking the rotation of the rotating body within the set lock angle range is provided, the rotating body can be locked within the lock angle range. Therefore, for example, a rotating body that is not rotationally driven can be accommodated in an accommodating portion, and deterioration of efficiency due to resistance that the rotating body that is not rotationally driven receives from an external fluid can be suppressed.

The present disclosure can be realized as the following embodiments. For example, the present disclosure can be realized in the embodiment of a control method of an electric drive system, an electric aircraft provided with a control device of the electric drive system, an electric moving body, or the like.

A. First Embodiment

A-1. Device Configuration

A control device as one embodiment of the present disclosure shown in FIG. 1 is mounted on an electric drive system 10 (hereinafter, also referred to as "EDS (Electric Drive System) 10") to control an operation of the EDS 10. In the present embodiment, a plurality of EDS 10s are mounted on an electric vertical take-off and landing aircraft 100 (hereinafter, also referred to as "eVTOL 100"). The eVTOL 100 is configured as a manned aircraft that is electrically driven and can take off and land in a vertical direction. The eVTOL 100 includes an airframe 20, a plurality of rotary blades 30, and a plurality of EDSs 10 provided corresponding to each rotary blade 30 for rotationally driving each rotary blade 30. The eVTOL 100 of the present embodiment includes six rotary blades 30 and six EDSs 10, respectively. The number of rotary blades 30 and EDSs 10 included in the eVTOL 100 is not limited to six, and may be any number such as four or nine.

The airframe 20 corresponds to a portion of the eVTOL 100 excluding the six rotary blades 30 and the six EDSs 10. The airframe 20 includes an airframe main body 21, two main wings 25, and a tail wing 28.

The airframe main body 21 constitutes a body portion of the eVTOL 100 and is formed along a front-rear direction of the eVTOL 100. A passenger compartment 22 is formed inside the airframe main body 21 on a front side. Two rotary blades 30 are arranged side by side in the front-rear direction on a vertically upper surface on a rear side of the airframe main body 21. The two main wings 25 are formed so as to extend from the airframe main body 21 in a right direction and a left direction, respectively. Rotary blade 30 is arranged substantially in a center of each main wing 25. A rotary blade 30 is arranged at a tip of each main wing 25. The tail wing 28 is formed at a rear end portion of the airframe main body 21.

Of the six rotary blades 30, the two rotary blades 30 arranged in the aircraft main body 21 and the two rotary blades 30 arranged in the substantially central portion of each main wing 25 are mainly configured as the lift rotary blades 31 for obtaining the lift of the airframe 20. The lift rotary blade 31 is rotationally driven when an operation mode of the eVTOL 100 is the takeoff mode or the like. Further, the lift rotary blade 31 may not be rotationally driven when the operation mode of the eVTOL 100 is a cruising mode or the like. In the present embodiment, each lift rotary blade 31 is locked in a specific angle range in a state where it is not rotationally driven, and is housed in an accommodating portion 35 formed vertically below each lift rotary blade 31. The accommodating portion 35 is formed along a direction substantially parallel to the front-rear direction of the eVTOL 100. A detailed description of the lock of the lift rotary blade 31 will be described later. A tilt angle of each lift rotary blade 31 is fixed.

Of the six rotary blades 30, the two rotary blades 30 arranged at the tip of each main wing 25 are configured as tilt rotors 32. Each tilt rotor 32 is configured so that a tilt angle can be changed. In each tilt rotor 32, the tilt angle is set so that a rotation axis of the tilt rotor 32 is along the vertical direction as shown in FIG. 1 when the operation mode of the eVTOL 100 is a takeoff mode. Unlike the state shown in FIG. 1, when the operation mode of the eVTOL 100 is a cruising mode or the like, the tilt angle of each tilt rotor 32 is set so that the rotation axis of the tilt rotor 32 is along the horizontal direction. The tilt rotor 32 may not be rotationally driven when the operation mode of the eVTOL 100 is a landing mode or the like. In the present embodiment, each tilt rotor 32 is locked in a specific angle range in a state where it is not rotationally driven. A detailed description of the lock of the tilt rotor 32 will be described later.

The six rotary blades 30 are rotationally driven independently of each other around their respective rotation axes. Each rotary blades 30 has blades 33 formed symmetrically about the rotation axis along a direction perpendicular to the rotation axis. The blade 33 has a substantially plate-like appearance shape, and a rotation shaft is inserted through a substantially central portion. In the present embodiment, each rotary blade 30 has two blades 33, respectively. The two blades 33 are configured to be independently rotatable.

The six EDSs 10 are configured as drive devices for rotationally driving each rotary blade 30. Four of the six EDSs 10 rotate and drive the lift rotary blade 31 respectively. Two of the six EDSs 10 rotate the tilt rotor 32, respectively. The configurations of each EDS 10 are approximately equal to each other.

Figure 2:
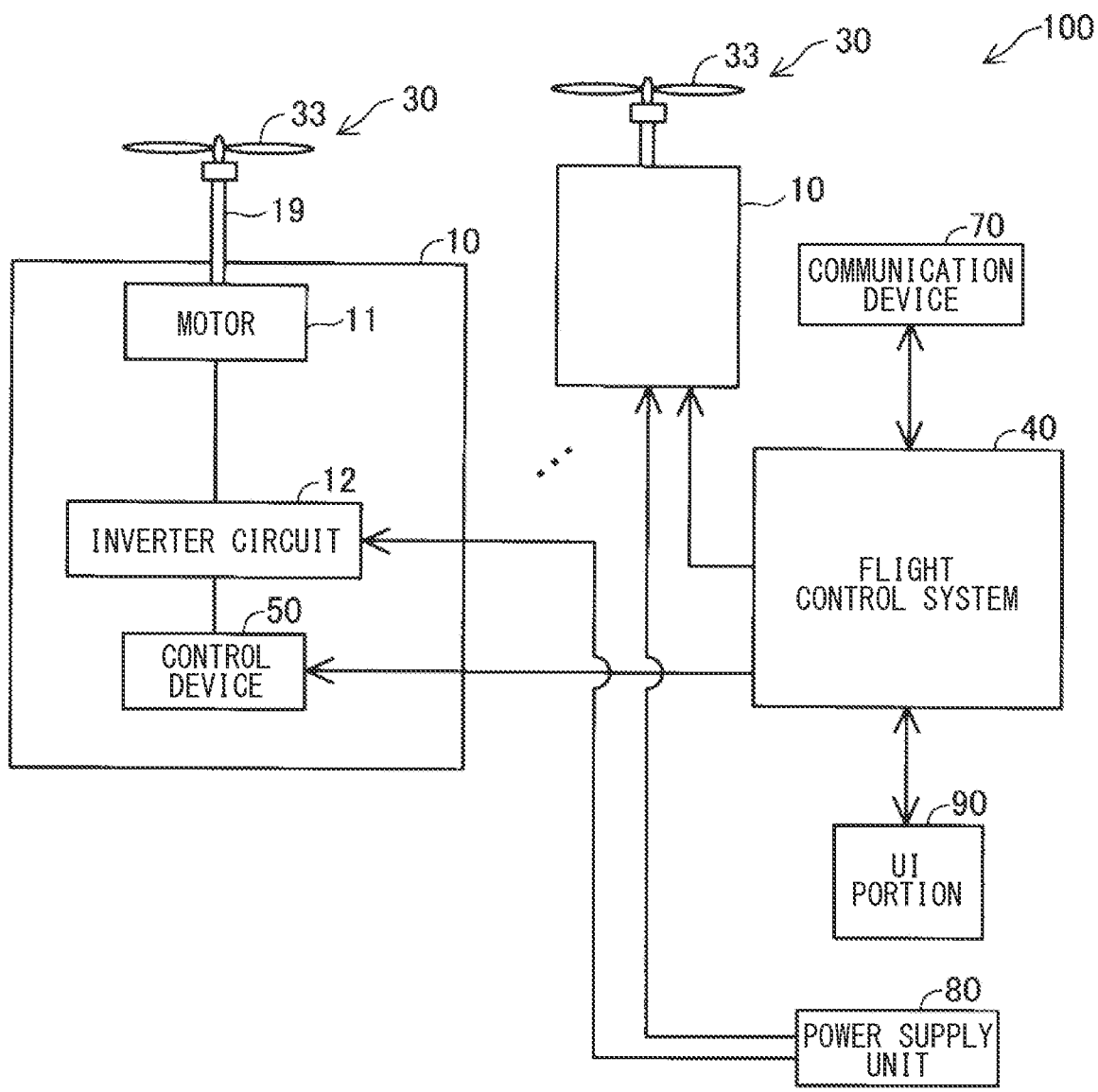
FIG. 2 is a block diagram showing a schematic configuration of an electric vertical take-off and landing aircraft.

As shown in FIG. 2, each EDS 10 includes a motor 11, an inverter circuit 12, and a control device 50.

Figure 3:
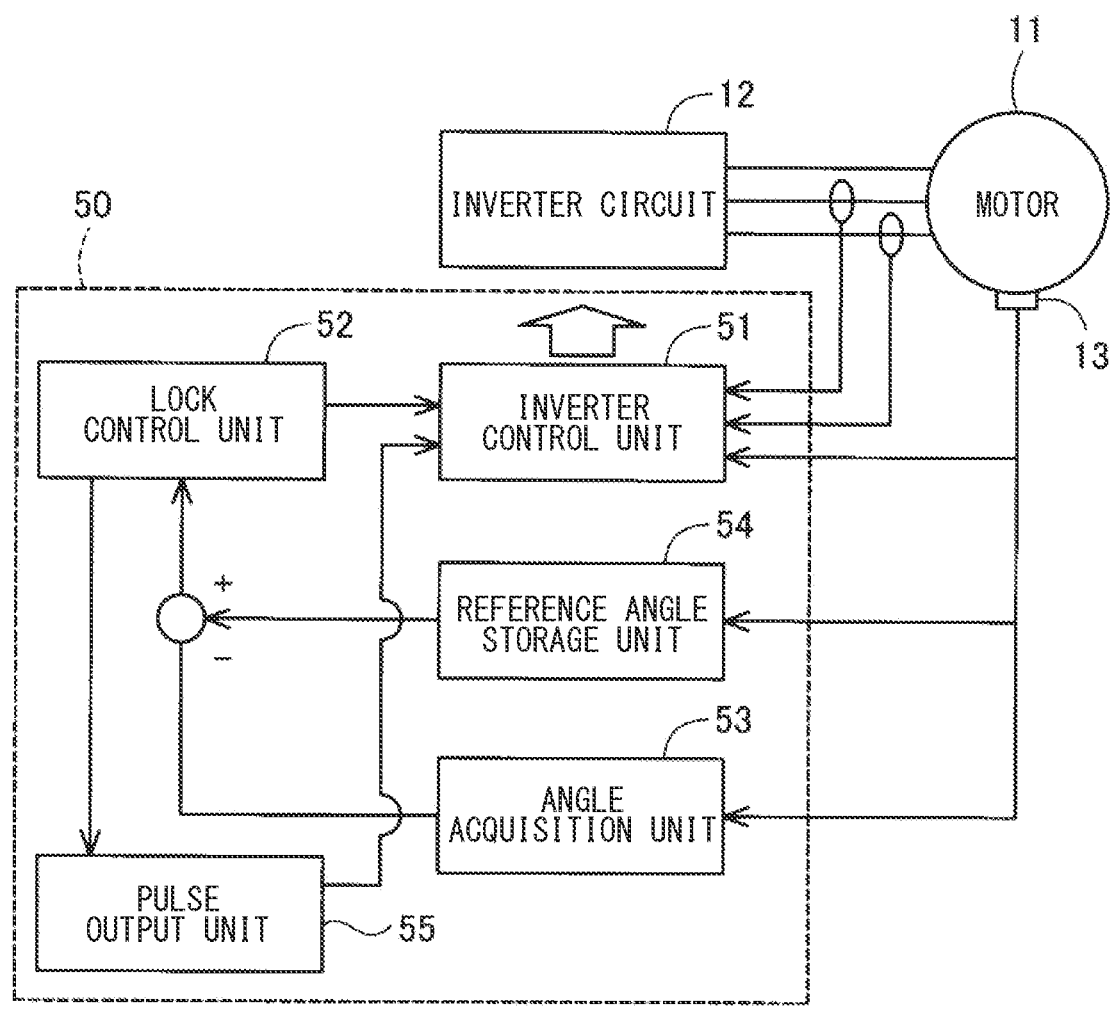
FIG. 3 is a block diagram for explaining a schematic configuration of a control device.

The motor 11 outputs torque corresponding to the voltage and current supplied from the inverter circuit 12, and drives the rotary blade 30 to rotate via the shaft 19. A rotation control of the motor 11 is executed so that a torque as instructed is output using an electric angle. In the present embodiment, the motor 11 is composed of a brushless motor, but is not limited to the brushless motor, and may be configured by any motor such as an induction motor or a reluctance motor. In the present embodiment, the output of the motor 11 is transmitted to the rotary blade 30 without going through a gear. Therefore, a mechanical angle of the motor 11 and a rotation angle of the rotary blade 30 match. As shown in FIG. 3, the motor 11 of the present embodiment is provided with an angle sensor 13 configured by a resolver or the like. The angle sensor 13 may be omitted.

The inverter circuit 12 shown in FIG. 2 includes switching elements such as an IGBT (Insulated Gate Bipolar Transistor) and a MOSFET (Metal-Oxide-Semiconductor Field-Effect Transistor), and converts a DC voltage supplied from a power supply unit 80 into a three-phase AC voltage and supplies it to the motor 11. The inverter circuit 12 switches a switching element at a duty ratio according to a control signal supplied from the control device 50.

The control device 50 shown in FIG. 3 is composed of a computer having a CPU (Central Processing Unit), a ROM (Read Only Memory), and a RAM (Random Access Memory). The CPU functions as an inverter control unit 51, a lock control unit 52, and an angle acquisition unit 53 by executing a control program stored in advance in the ROM. The ROM and RAM of the control device 50 also function as a reference angle storage unit 54. Further, the control device 50 has a pulse output unit 55.

The inverter control unit 51 controls the operation of the inverter circuit 12 by outputting a control signal to the inverter circuit 12. The lock control unit 52 outputs a control signal to the inverter control unit 51 to control the motor 11, so that the rotation of the rotary blade 30 is locked within a preset angle range (hereinafter, also referred to as "lock angle range"). The angle acquisition unit 53 acquires a current angle of the motor 11. In the present embodiment, the angle acquisition unit 53 acquires the electric angle of the motor 11 by using the value measured by the angle sensor 13, but the electric angle of the motor 11 may be estimated from a value measured by a current sensor (not shown) provided in each phase of the inverter circuit 12. The reference angle storage unit 54 stores a reference angle. The reference angle means an angle corresponding to a target lock position when the rotation of the rotary blade 30 is locked within the lock angle range. The reference angle of the present embodiment is represented by the electric angle of the motor 11 as described later. The pulse output unit 55 is composed of a circuit including a transistor, and outputs a pulse according to a control signal received from the lock control unit 52. A detailed description of the lock control unit 52, the angle acquisition unit 53, the reference angle storage unit 54, and the pulse output unit 55 will be described later.

As shown in FIG. 2, various components for controlling each EDS 10 are arranged in the eVTOL 100. Specifically, the eVTOL 100 includes a flight control system 40, a communication device 70, the power supply unit 80, and a user interface unit 90 (hereinafter, also referred to as "UI unit 90").

The flight control system 40 is composed of a computer having a CPU, a ROM and a RAM. The CPU controls the overall operation of the eVTOL 100 by executing a control program stored in the ROM in advance. The overall operation of the eVTOL 100 corresponds to, for example, a takeoff operation, a landing operation, a cruising operation, and the like. Such an operation may be performed based on a preset flight program or may be performed by the maneuvering of an occupant. The flight control system 40 is connected to each EDS 10, and outputs a control command to the control device 50 of each EDS 10 according to the operation mode of the eVTOL 100. Further, the flight control system 40 outputs a lock command for stopping and locking the rotation of the rotary blade 30 that is not driven to rotate to the control device 50 of each EDS 10. For example, when the operation mode of the eVTOL 100 is the cruising mode, the lock command is output to the control device 50 of the EDS 10 corresponding to the lift rotary blade 31. Further, for example, when the operation mode of the eVTOL 100 is the landing mode, the lock command is output to the control device 50 of the EDS 10 corresponding to the tilt rotor 32. A detailed description of the lock of the rotary blade 30 will be described later.

The communication device 70 communicates with another eVTOL 100, a control tower on the ground, and the like. The communication device 70 corresponds to, for example, a civilian VHF (Very High Frequency) radio. In addition to the civilian VHF, the communication device 70 may be configured as a device that performs communication such as a wireless LAN specified in IEEE802.11 or a wired LAN specified in IEEE802.3.

The power supply unit 80 functions as one of the power supply sources in the eVTOL 100, and supplies three-phase AC power to the motor 11 via the inverter circuit 12 of each EDS 10. In the present embodiment, the power supply unit 80 is composed of a lithium ion battery, but is not limited to the lithium ion battery and may be composed of any secondary battery such as a nickel hydrogen battery, and may be an arbitrary power supply source such as a fuel cell or a generator in place of or in addition to the secondary battery.

The UI unit 90 supplies a predetermined user interface. The user interface includes, for example, an operation input unit such as a keyboard and a button, a display unit such as a liquid crystal panel, and the like. The UI unit 90 is provided in, for example, the passenger compartment 22 of the eVTOL 100. The occupant can change the operation mode of the eVTOL 100 by using the UI unit 90.

The control device 50 of the EDS 10 in the present embodiment executes the lock process described later, so that the control device 50 locks the rotary blade 30 in the currently rotationally driven state by stopping the rotation of the rotary blade 30 at the target lock position as a target when a non-rotary driven state is planned. The lock angle range described above means a range allowed as a range of deviation with respect to the target lock position. Therefore, the lock angle range includes the target lock position.

Figure 4:
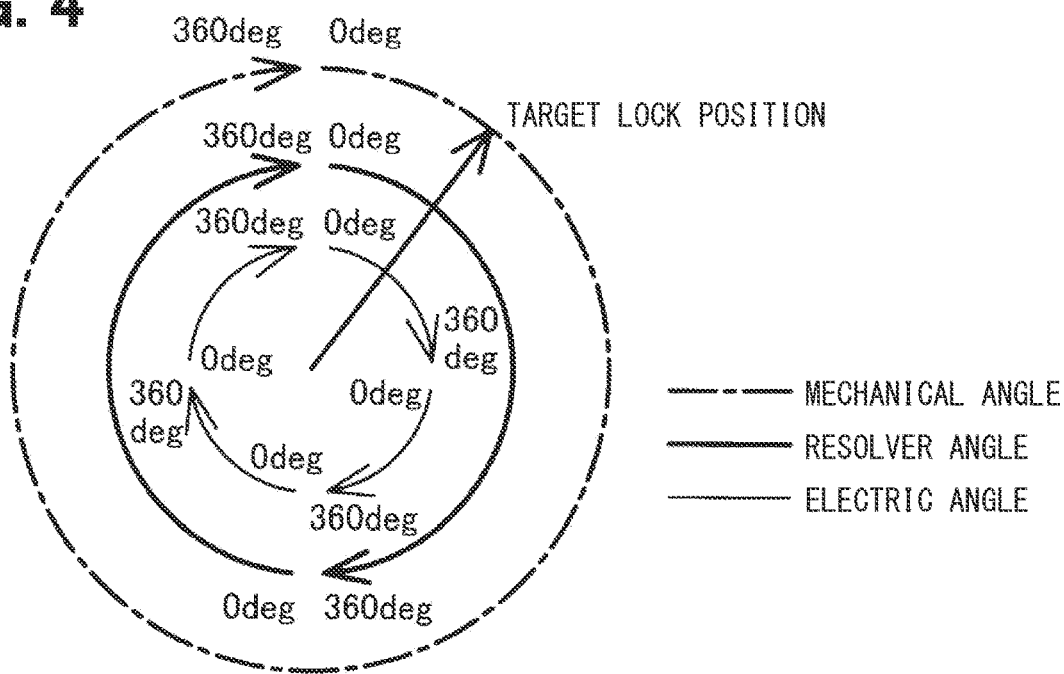
FIG. 4 is an explanatory diagram for explaining a target lock position.
Figure 5:
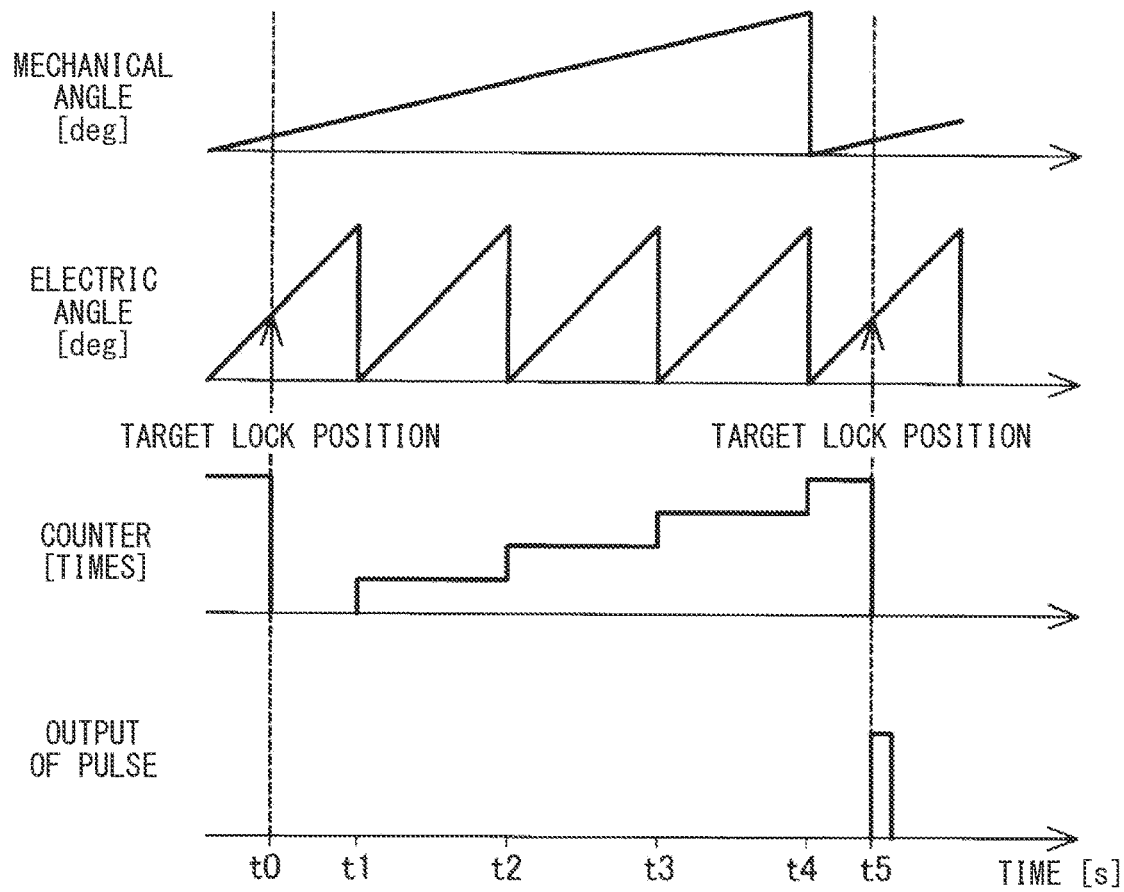
FIG. 5 is an explanatory diagram for explaining a method of locking at a reference angle as a target.

A relationship between the target lock position, and the mechanical angle and the electric angle of the motor 11 will be described with reference to FIGS. 4 and 5. In FIG. 4, the mechanical angle of the motor 11 is shown by an alternate long and short dash line, the electric angle is shown by a thin solid line, and a resolver angle is shown by a thick solid line as a reference. Further, a horizontal axis of FIG. 5 indicates a time (s). In the present embodiment, since the output of the motor 11 is transmitted to the rotary blade 30 without going through the gear, the target lock position of the rotary blade 30 can be represented by the mechanical angle of the motor 11. In the examples shown in FIGS. 4 and 5, the lock angle range is not shown.

As described above, the rotation control of the motor 11 is performed using the electric angle. In the examples shown in FIGS. 4 and 5, the mechanical angle (deg) and the electric angle (deg) in the motor 11 having 4 pole pairs are shown. The number of pole pairs corresponds to the number of magnetic poles of the motor 11 divided by two. The number of cycles of the electric angle per unit time corresponds to the value obtained by multiplying the number of cycles of the mechanical angle per unit time by the number of pole pairs. In the examples shown in FIGS. 4 and 5, it is established that a relationship of the number of cycles of the mechanical angle of the motor 11 per unit time and the number of cycles of the electric angle of the motor 11 per unit time is equal to a relationship between 1 and 4. During one cycle in which the motor 11 makes one rotation and the mechanical angle is from 0 deg to 360 deg, there are four cycles of electric angles from 0 deg to 360 deg.

A-2. Lock Processing

Figure 6:
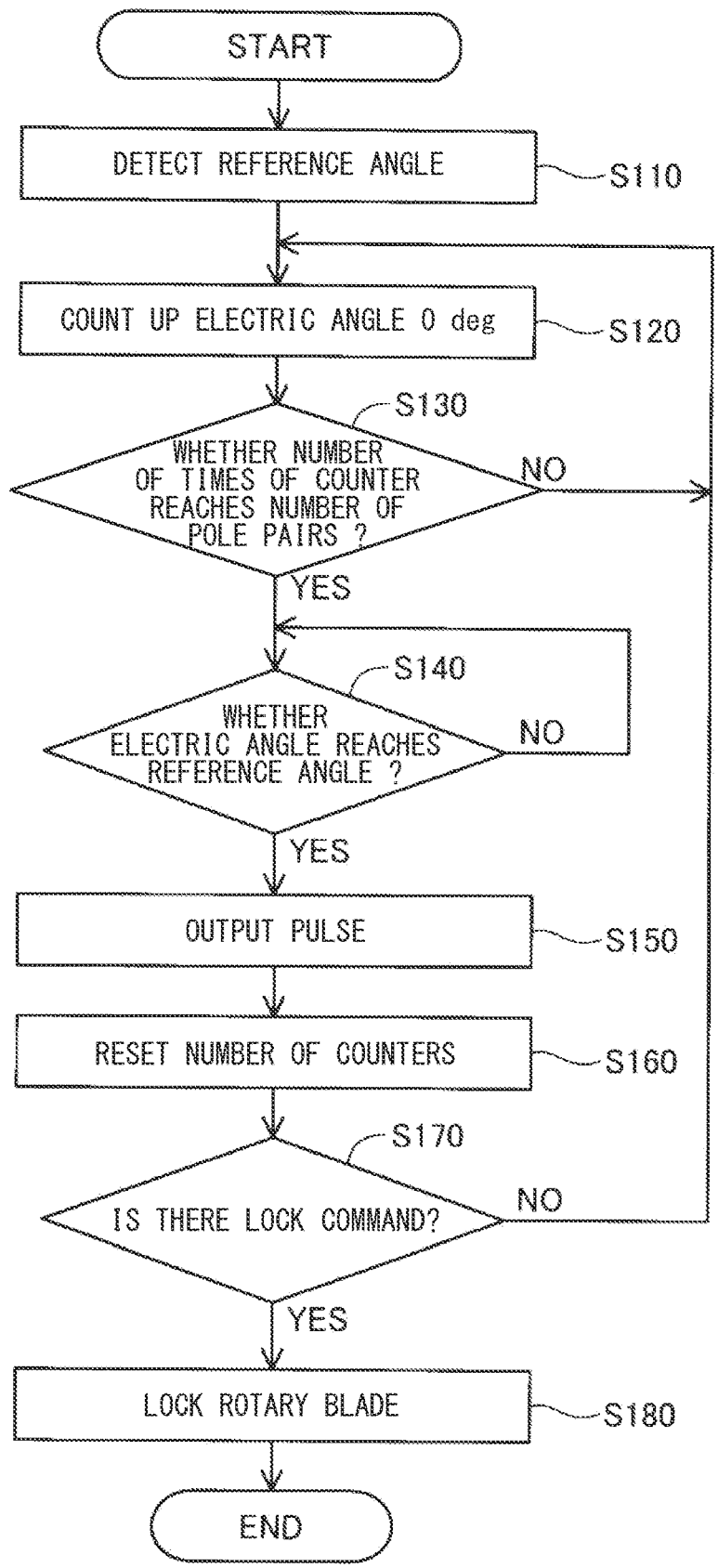
FIG. 6 is a flowchart showing a procedure of lock processing.

The lock processing shown in FIG. 6 is executed in the control device 50 of each EDS 10 when the rotation of the motor 11 is started in each EDS 10.

The lock control unit 52 detects a reference angle, that is, an angle corresponding to a target lock position when the rotary blade 30 is locked in the lock angle range (step S110). In the present embodiment, the reference angle is stored in the reference angle storage unit 54 as the value of the electric angle of the motor 11 when the rotation of the rotary blade 30 is locked last time. Therefore, in step S110, the value of the electric angle is read out from the reference angle storage unit 54 and detected. The reference angle may be stored in the reference angle storage unit 54 as the value of the electric angle when a start switch of the eVTOL 100 is turned on (time t0). In FIG. 5, a time when the rotation of the motor 11 starts is shown as t0. As described above, when the value of the electric angle at the time of the previous lock is the reference angle and the eVTOL100 is stopped in the locked state, the value of the electric angle when the start switch of the eVTOL100 is turned on (time t0) next time corresponds to the reference angle.

As shown in FIG. 6, the lock control unit 52 counts up the number of times the electric angle of the motor 11 reaches 0 deg (step S120). In the example shown in FIG. 5, the number of counters is one at time t1, two at time t2, three at time t3, and four at time t4 as the motor 11 rotates.

As shown in FIG. 6, the lock control unit 52 specifies whether or not the number of counters has reached the number of pole pairs (step S130). When it is specified that the number of times of the counter has not reached the number of pole pairs (step S130: NO), the process returns to step S120. On the other hand, when it is specified that the number of counters has reached the number of pole pairs (step S130: YES), the lock control unit 52 specifies whether or not a current electric angle of the motor 11 has reached the reference angle (step S140). As shown in FIG. 5, the electric angle at time t4 when the number of counters reaches the number of pole pairs is 0 deg. The value of the electric angle increases with the rotation of the motor 11 and reaches the reference angle at time t5.

As shown in FIG. 6, when it is specified that the current electric angle of the motor 11 has not reached the reference angle (step S140: NO), the lock control unit 52 repeats step S140. On the other hand, when it is specified that the current electric angle of the motor 11 has reached the reference angle (step S140: YES), the lock control unit 52 causes the pulse output unit 55 to output a pulse (step S150). In the example shown in FIG. 5, the pulse is output at time t5. By being controlled in this way, the pulse output unit 55 outputs a pulse each time the rotational position of the rotary blade 30 reaches the target lock position.

As shown in FIG. 6, the lock control unit 52 resets the number of counters (step S160). The lock control unit 52 determines whether or not there is a lock command from the flight control system 40 (step S170). If it is determined that there is no lock command (step S170: NO), the process returns to step S120. On the other hand, when it is determined that there is the lock command (step S170: YES), the rotation of the rotary blade 30 is locked by locking the rotation of the motor 11 (step S180). In step S180, the rotation of the motor 11 is locked as a target at the reference angle first reached after the number of counters reaches the number of pole pairs of the motor 11, and the rotation of the rotary blade 30 is locked. As shown in FIG. 3, the rotation lock of the motor 11 may be controlled so that the current electric angle of the motor 11 acquired by the angle acquisition unit 53 matches the reference angle stored in the reference angle storage unit 54. At this time, instead of suddenly stopping the rotation of the motor 11, the rotation speed may be gradually reduced, and the rotation of the motor 11 may be stopped and locked when the reference angle is reached after the rotation speed becomes equal to or less than a predetermined rotation speed. Execution of step S180 ends the lock processing.

In the lock processing of the present embodiment, when the operation mode of the eVTOL 100 is the cruising mode or the like, the lift rotary blade 31 that is not driven to rotate is locked at the target lock position within the lock angle range. Here, the lock angle range of the lift rotary blade 31 is included in an accommodation angle range which is an angle range in which the lift rotary blade 31 can be housed in the accommodating portion 35. Therefore, the lift rotary blade 31 is stopped and locked at an angle at which the lift rotary blade 31 can be housed in the accommodating portion 35. As described above, the lift rotary blade 31 of the present embodiment has two blades 33 and is housed in the accommodating portion 35. When the two blades 33 are housed in the accommodating portion 35, the two blades 33 are overlapped so as to coincide with each other in a longitudinal direction. At this time, one of the two blades 33 may be locked at the target lock position, and the other blade 33 may be overlapped with the one blade 33. In this case, the rotary blade 30 may be provided with a mechanism for overlapping the other blade 33 with the one blade 33. Further, the two blades 33 may be controlled so as to be independently locked at their respective target lock positions.

Further, in the lock processing of the present embodiment, when the operation mode of the eVTOL 100 is the landing mode or the like, the tilt rotor 32 that is not driven to rotate is locked within the lock angle range. The tilt rotor 32 is stopped and locked at an angle such that the value of air resistance becomes small. In the present embodiment, the tilt rotor 32 is stopped from rotating at an angle at which the air resistance value received by the tilt rotor 32 according to the lock position of the tilt rotor 32 becomes smaller than an intermediate value between a maximum value and a minimum value and is locked. More specifically, the tilt rotor 32 is stopped and locked at an angle at which the air resistance value becomes minimum.

Further, in the present embodiment, the lock angle range is [B−2π/A] or more [B+2π/A] or less when the number of blades 33 of the rotary blade 30 is A, the target lock position is B, and 180 deg is π.

According to the control device 50 of the EDS 10 in the first embodiment described above, since the lock control unit 52 that locks the rotation of the rotary blade 30 within the set lock angle range is provided, the rotary blade 30 can be locked within the lock angle range. Therefore, for example, the rotary blade 30 that is not driven to rotate can be housed in the accommodating portion 35, and the deterioration of efficiency due to the air resistance of the rotary blade 30 that is not driven to rotate can be suppressed.

In the configuration in which the rotary blade 30 that is not driven to rotate is not locked, the life of the rotary blade 30 and the motor 11 may be deteriorated or a failure of the rotary blade 30 and the motor 11 may be induced due to an idle rotation of the rotary blade 30. Further, due to such a failure, the rotary blade 30 may not operate as instructed in a situation where the rotary blade 30 is desired to be rotationally driven. As described above, in the configuration in which the rotary blade 30 that is not driven to rotate is not locked, a defect due to the idle rotation of the rotary blade 30 may occur.

On the other hand, according to the control device 50 of the EDS 10 of the present embodiment, since the rotary blade 30 that is not rotationally driven is locked within the lock angle range, it is possible to suppress an occurrence of the defect caused by the idle rotation of the rotary blade 30.

Further, the lock angle range of the lift rotary blade 31 is included in an accommodation angle range which is the angle range in which the lift rotary blade 31 can be housed in the accommodating portion 35. Therefore, the lift rotary blade 31 that is not rotationally driven can be easily housed in the accommodating portion 35 provided in the airframe 20 of the eVTOL 100. Further, since the lock angle range is included in the accommodation angle range, it is possible to omit providing a guide or the like in the accommodating portion 35 for accommodating the lift rotary blade 31, and it is possible to prevent the configuration of the accommodating portion 35 from becoming complicated.

Further, the lock angle range in the tilt rotor 32 is an angle range in which the air resistance value is smaller than an intermediate value between a maximum value and a minimum value of the air resistance value received by the tilt rotor 32 according to the lock position of the tilt rotor 32. Therefore, it is possible to effectively suppress the deterioration of efficiency due to the air resistance of the tilt rotor 32 that is not driven to rotate. Further, since the tilt rotor 32 is locked by stopping the rotation at an angle that minimizes the air resistance value, deterioration of efficiency can be further suppressed.

Further, the lock angle range is [B−2π/A] or more [B+2π/A] or less when the number of blades 33 of the rotary blade 30 is A, the target lock position is B, and 180 deg is π. Therefore, it is possible to prevent the angle at which the rotary blade 30 is locked from being significantly deviated from the target lock position.

Further, since the control device 50 has the reference angle storage unit 54 that stores the reference angle for locking the rotary blade 30 in the lock angle range as the value of the electric angle of the motor 11, the motor 11 can be locked using the reference angle. It is possible to prevent the control for locking the rotation of the motor 11 from becoming complicated.

Further, the lock control unit 52 counts up the number of times the electric angle of the motor 11 reaches 0 deg, and the rotation of the motor 11 is locked as a target at the reference angle first reached after the number of counters reaches the number of pole pairs of the motor 11, and the rotation of the rotary blade 30 is locked. Therefore, since the rotation of the rotary blade 30 can be locked by using the electric angle of the motor 11, a detection unit for detecting the current rotational position of the rotary blade 30 and an angle sensor and the like for detecting the current rotation angle of the rotary blade 30 can be omitted, and further, an angle sensor 13 of the motor can be omitted. Therefore, it is possible to suppress the complication of the structure of the eVTOL 100, the rotary blade 30, and the EDS 10, and it is possible to suppress an increase in the cost required for manufacturing the eVTOL 100, the rotary blade 30, and the EDS 10.

B. Second Embodiment

Figure 7:
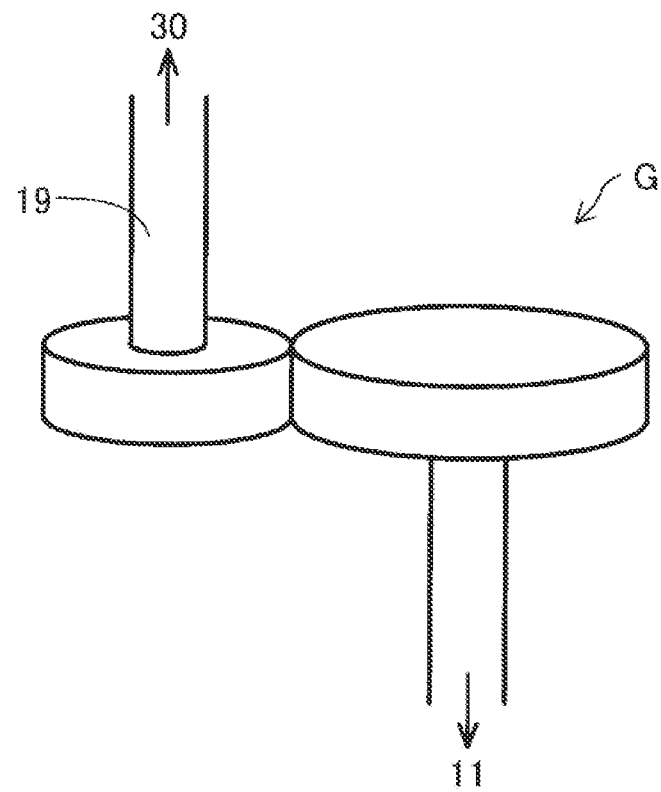
FIG. 7 is a schematic diagram showing a connection relationship between a motor and a rotating body in a second embodiment.

As shown in FIG. 7, in the EDS 10 on which the control device 50 of a second embodiment is mounted, the output of the motor 11 is transmitted to the rotary blade 30 via the gear G, and in this respect, the EDS 10 of the second embodiment is different from the EDS 10 of the first embodiment. Along with this difference, the lock processing of the second embodiment is different from the lock processing of the first embodiment in that step S130*a* is executed instead of step S130. Since the other configurations are the same as those in the first embodiment, the same configurations are designated by the same reference numerals, and detailed description thereof will be omitted.

In the EDS 10 of the second embodiment, the output of the motor 11 is transmitted to the rotary blade 30 via the gear G. Therefore, the mechanical angle of the motor 11 and the rotation angle of the rotary blade 30 do not match. Therefore, in order to stop the rotation of the rotary blade 30 and lock the rotary blade 30 at the target lock position, it is necessary to estimate the rotation angle of the rotary blade 30 from the electric angle of the motor 11 in consideration of a gear ratio.

Figure 8:
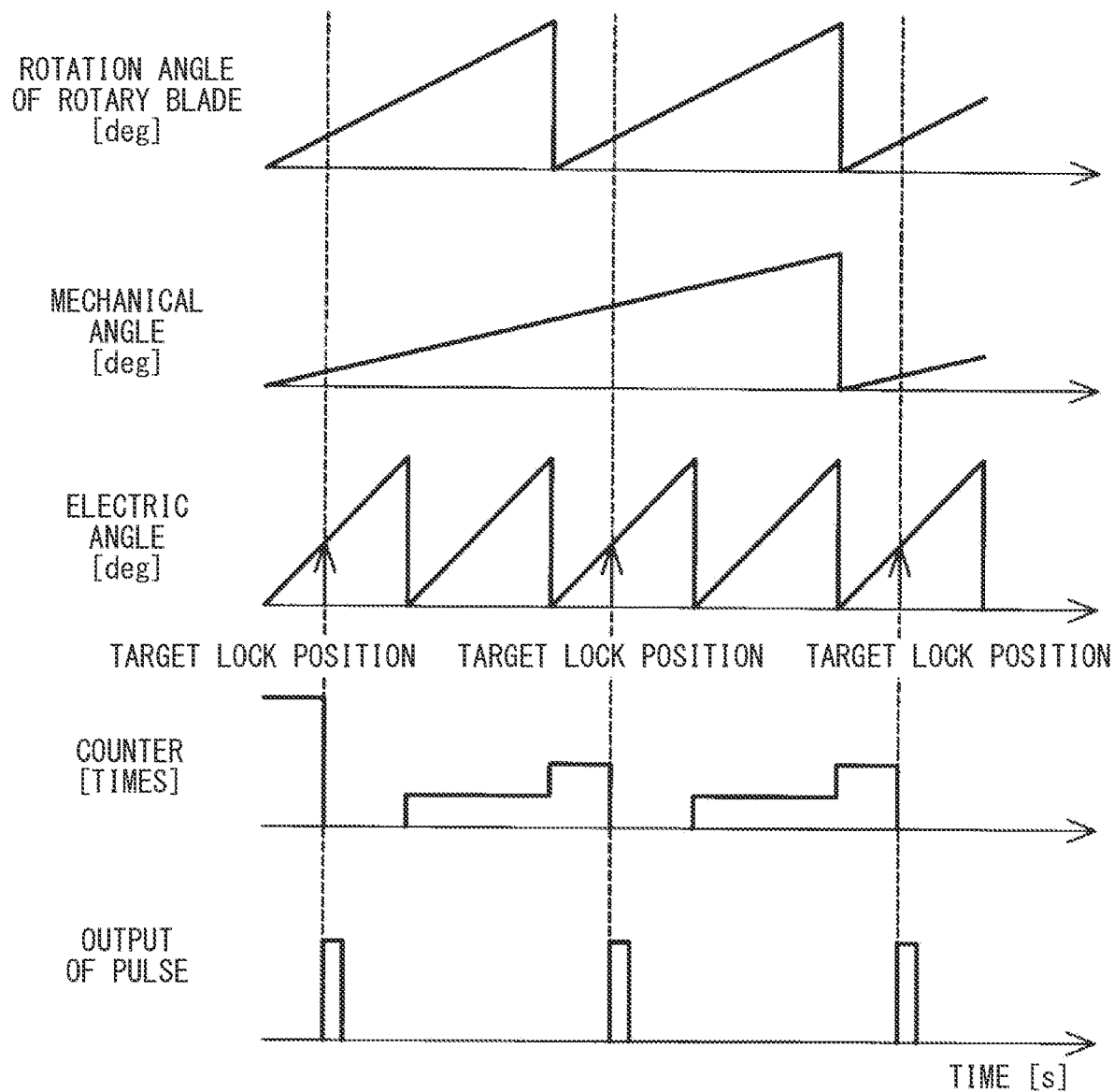
FIG. 8 is an explanatory diagram for explaining a method of locking at a reference angle as a target.
Figure 9:
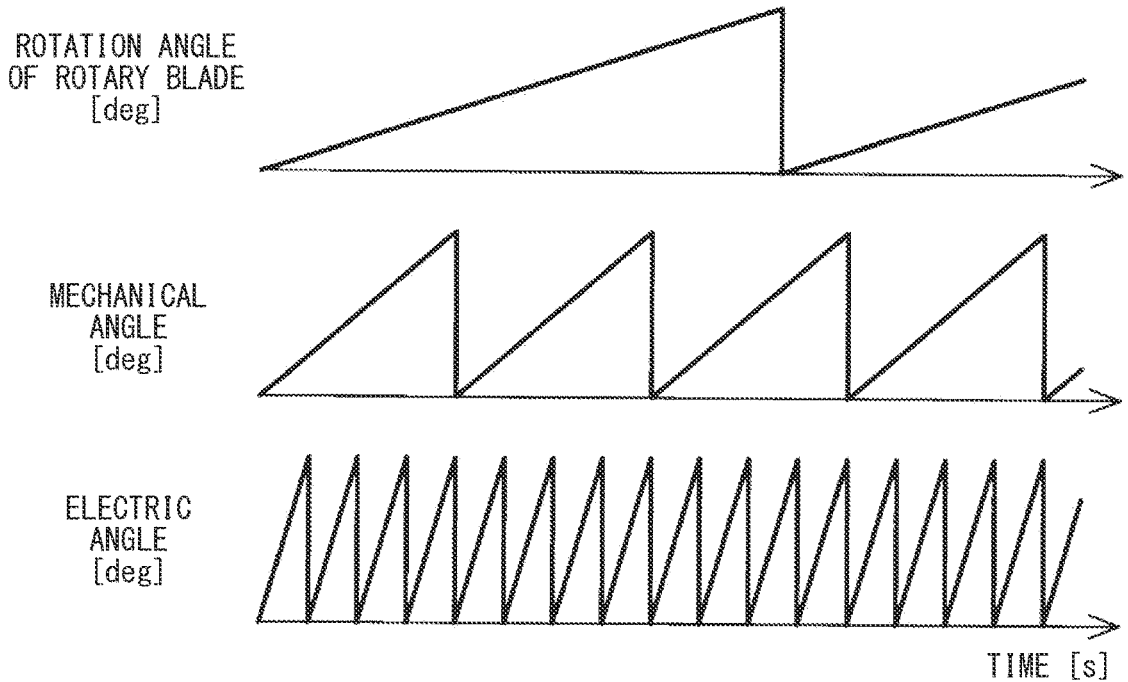
FIG. 9 is an explanatory diagram showing one example of a relationship between a rotation angle and an electric angle.
Figure 10:
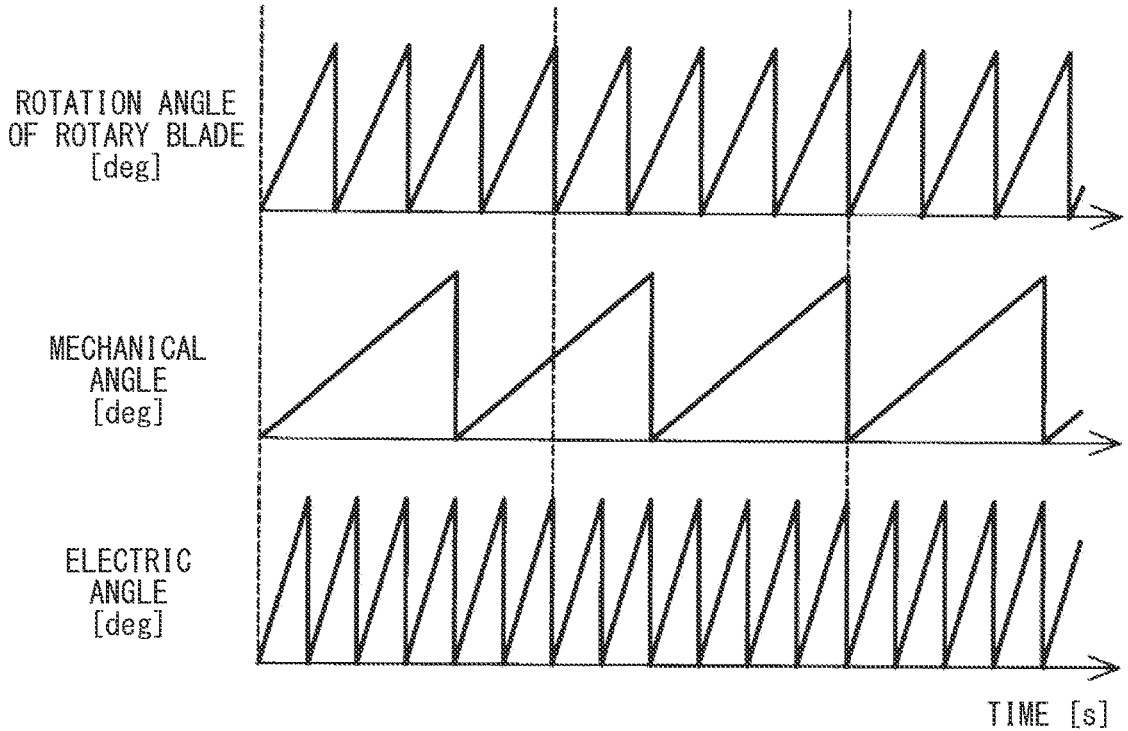
FIG. 10 is an explanatory diagram showing another example of the relationship between the rotation angle and the electric angle.

FIGS. 8 to 10 show a relationship between the rotation angle of the rotary blade 30 and the mechanical angle of the motor 11 and the electric angle of the motor 11. FIG. 8 shows a case where a gear ratio of the gear G is 2 and the number of pole pairs of the motor 11 is 4. Since the gear ratio of the gear G is 2, the rotary blade 30 makes two rotations while the motor 11 makes one rotation. Therefore, there are two cycles of electric angles from 0 deg to 360 deg during the period when the rotary blade 30 makes one rotation and the mechanical angle is from 0 deg to 180 deg. The ratio of the rotation angle of the rotary blade 30 to the electric angle of the motor 11 can be calculated by using the gear ratio of the gear G and the number of pole pairs of the motor 11. In the example shown in FIG. 8, a relationship between the number of cycles of the rotation angle of the rotary blade 30 per unit time, the number of cycles of the mechanical angle of the motor 11 per unit time, and the number of cycles of the electric angle of the motor 11 per unit time is a relationship between 2, 1, and 4. Further, in FIG. 9, a relationship between the number of cycles of the rotation angle of the rotary blade 30 per unit time, the number of cycles of the mechanical angle of the motor 11 per certain unit time, and the number of cycles of the electric angle of the motor 11 per certain unit time is a relationship between 3, 12, and 32. In FIG. 10, a relationship between the number of cycles of the rotation angle of the rotary blade 30 per unit time. the number of cycles of the mechanical angle of the motor 11 per unit time, and the number of cycles of the electric angle of the motor 11 per unit time is a relationship between 8, 3, and 12.

The electric angle of the motor 11 at the timing when the rotation angle of the rotary blade 30 is a certain value periodically shows the same value. Therefore, the electric angle of the motor 11 when the rotation angle of the rotary blade 30 is in the target lock position periodically shows the same value. More specifically, at least each time the timing of a least common multiple of the value of the ratio of the electric angle of the motor 11 to the rotation angle of the rotary blade 30 is reached, the rotation angle of the rotary blade 30 shows the same value. The least common multiple of the value of the ratio of the electric angle of the motor 11 to the rotation angle of the rotary blade 30 is "2", since for example, in the example shown in FIG. 8, the relationship between the rotation angle of the rotary blade 30 and the electric angle of the motor 11 is the relationship between 2 and 4, namely 1 and 2. Therefore, the rotation angle of the rotary blade 30 and the electric angle of the motor 11 are also 0 deg for every two cycles of the electric angle of the motor 11. Further, for example, in the example shown in FIG. 9, since the relationship between the rotation angle of the rotary blade 30 and the electric angle of the motor 11 is the relationship between 3 and 32, the least common multiple of the ratio of the electric angle of the motor 11 to the rotation angle of the rotary blade 30 is "96". Therefore, every 96 cycles of the electric angle of the motor 11, the rotation angle of the rotary blade 30 and the electric angle of the motor 11 are also 0 deg. Further, for example, in the example shown in FIG. 10, since the relationship between the rotation angle of the rotary blade 30 and the electric angle of the motor 11 is the relationship between 8 and 12, namely 2 and 3, the least common multiple of the ratio of the electric angle of the motor 11 to the rotation angle of the rotary blade 30 is "6". Therefore, every 6 cycles of the electric angle of the motor 11, the rotation angle of the rotary blade 30 and the electric angle of the motor 11 are also 0 deg.

Figure 11:
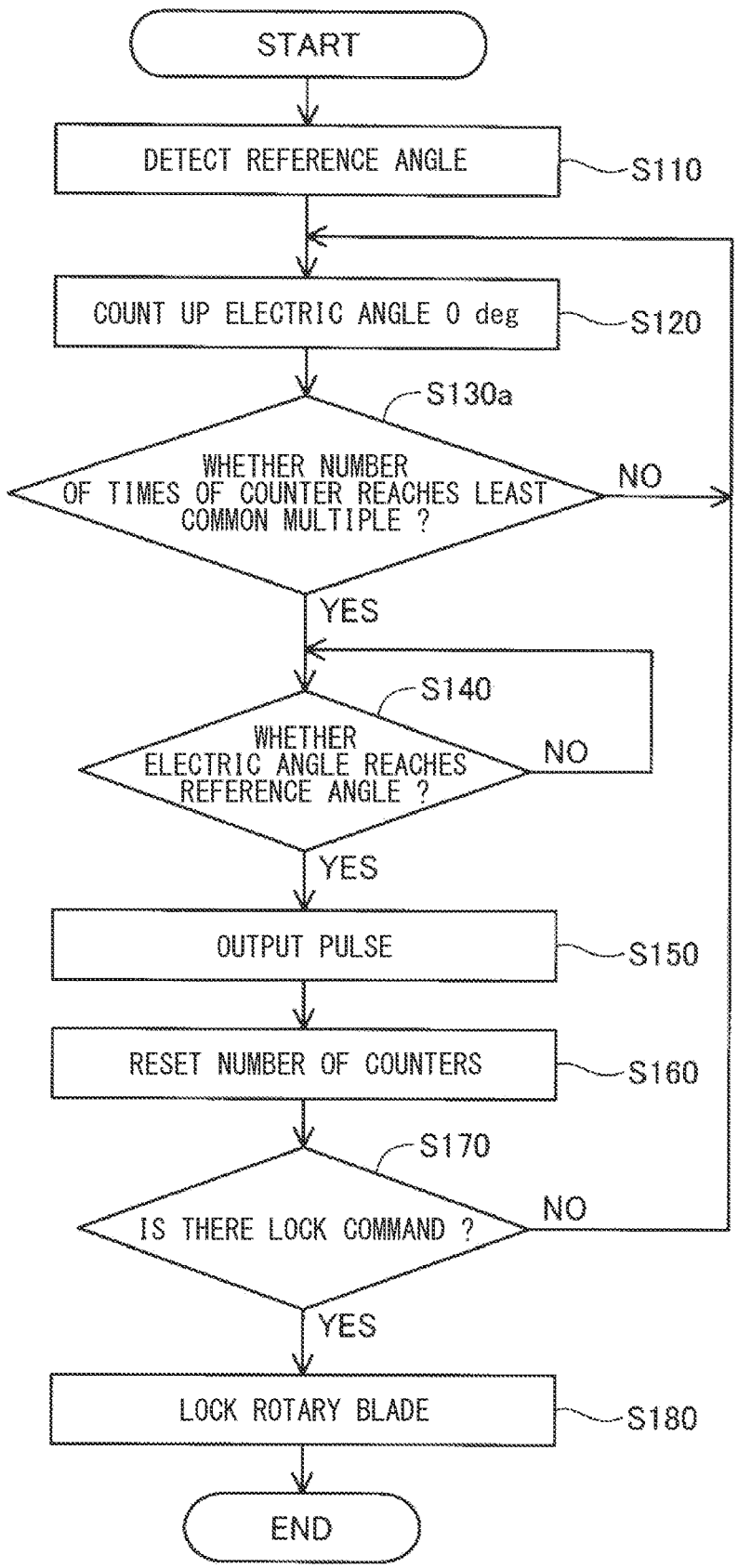
FIG. 11 is a flowchart showing a procedure of lock processing in the second embodiment.

In the lock processing of the second embodiment shown in FIG. 11, after the execution of step S120, the lock control unit 52 specifies whether the number of times of counters has reached the least common multiple of the value of the ratio of the electric angle of the motor 11 to the rotation angle of the rotary blade 30 (step S130a). When it is specified that the number of times of the counter does not reach the least common multiple of the value of the ratio of the electric angle of the motor 11 to the rotation angle of the rotary blade 30 (step S130a: NO), the process returns to step S120. On the other hand, when it is specified that the number of counters has reached the least common multiple of the value of the ratio of the electric angle of the motor 11 to the rotation angle of the rotary blade 30 (step S130a: YES), the lock control unit 52 specifies whether or not the current electric angle of the motor 11 has reached the reference angle (step S140). By being controlled in this way, the pulse output unit 55 outputs a pulse each time the electric angle of the motor 11 is the reference angle and the rotational position of the rotary blade 30 reaches the target lock position. In step S180 of the lock processing of the second embodiment, the rotation of the motor is locked as a target at the reference angle first reached after the number of counters reaches the least common multiple of the value of the ratio of the electric angle of the motor 11 to the rotation angle of the rotary blade 30, and the rotation of the rotary blade 30 is locked. Execution of step S180 ends the lock processing.

According to the control device 50 of the EDS 10 in the second embodiment described above, the same effect as that in the first embodiment is obtained. In addition, even in a configuration in which the output of the motor 11 is transmitted to the rotary blade 30 via the gear G, the rotation of the rotary blade 30 can be locked within the lock angle range.

C. Third Embodiment

Figure 12:
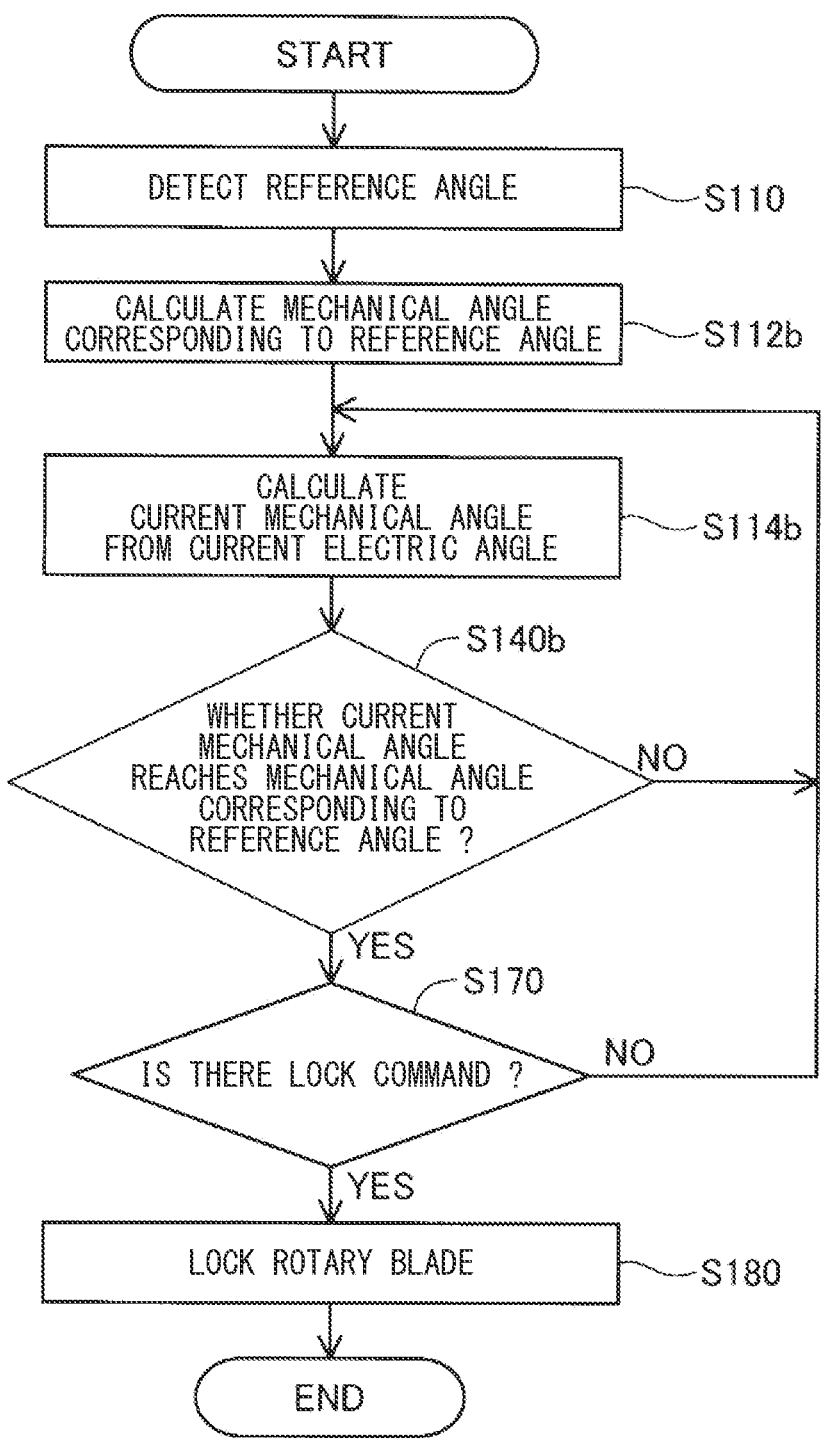
FIG. 12 is a flowchart showing a procedure of lock processing in a third embodiment.

As shown in FIG. 12, the lock processing executed in the control device 50 of a third embodiment is different from the lock processing of the first embodiment in that steps S112b, S114b and S140b are executed instead of steps S120 to S160. Since the other configurations are the same as those in the first embodiment, the same configurations are designated by the same reference numerals, and detailed description thereof will be omitted.

After executing step S110, the lock control unit 52 calculates the mechanical angle corresponding to the reference angle detected in step S110 (step S112b). The mechanical angle is calculated by dividing the detected reference angle by the number of pole pairs of the motor 11.

The lock control unit 52 calculates the current mechanical angle of the motor 11 from the current electric angle of the motor 11 (step S114b). The current mechanical angle of the motor 11 is calculated by dividing the current electrical angle of the motor 11 by the number of pole pairs of the motor 11. The lock control unit 52 specifies whether or not the current mechanical angle of the motor 11 calculated in step S114b has reached the mechanical angle corresponding to the reference angle of the motor 11 calculated in step S112b (step S140b). When it is specified that the current mechanical angle of the motor 11 has not reached the mechanical angle corresponding to the reference angle (step S140b: NO), the process returns to step S114b. On the other hand, when it is specified that the current mechanical angle of the motor 11 has reached the mechanical angle corresponding to the reference angle (step S140b: YES), the lock control unit 52 determines whether or not there is a lock command from the flight control system 40 (step S170). If it is determined that there is no lock command (step S170: NO), the process returns to step S114b. On the other hand, when it is determined that there is the lock command (step S170: YES), the rotation of the rotary blade 30 is locked by locking the rotation of the motor 11 (step S180). In step S180, the rotation of the motor 11 is locked as a target when the current mechanical angle of the motor 11 reaches the mechanical angle of the motor 11 at the reference angle and the rotation of the rotary blade 30 is locked. Execution of step S180 ends the lock processing.

According to the control device 50 of the EDS 10 in the third embodiment described above, the same effect as that in the first embodiment is obtained. In addition, since the lock control unit 52 calculates the mechanical angle corresponding to the electric angle, it is possible to omit counting up the number of times the electric angle of the motor 11 reaches 0 deg and outputting a pulse at the reference angle.

D. Fourth Embodiment

Figure 13:
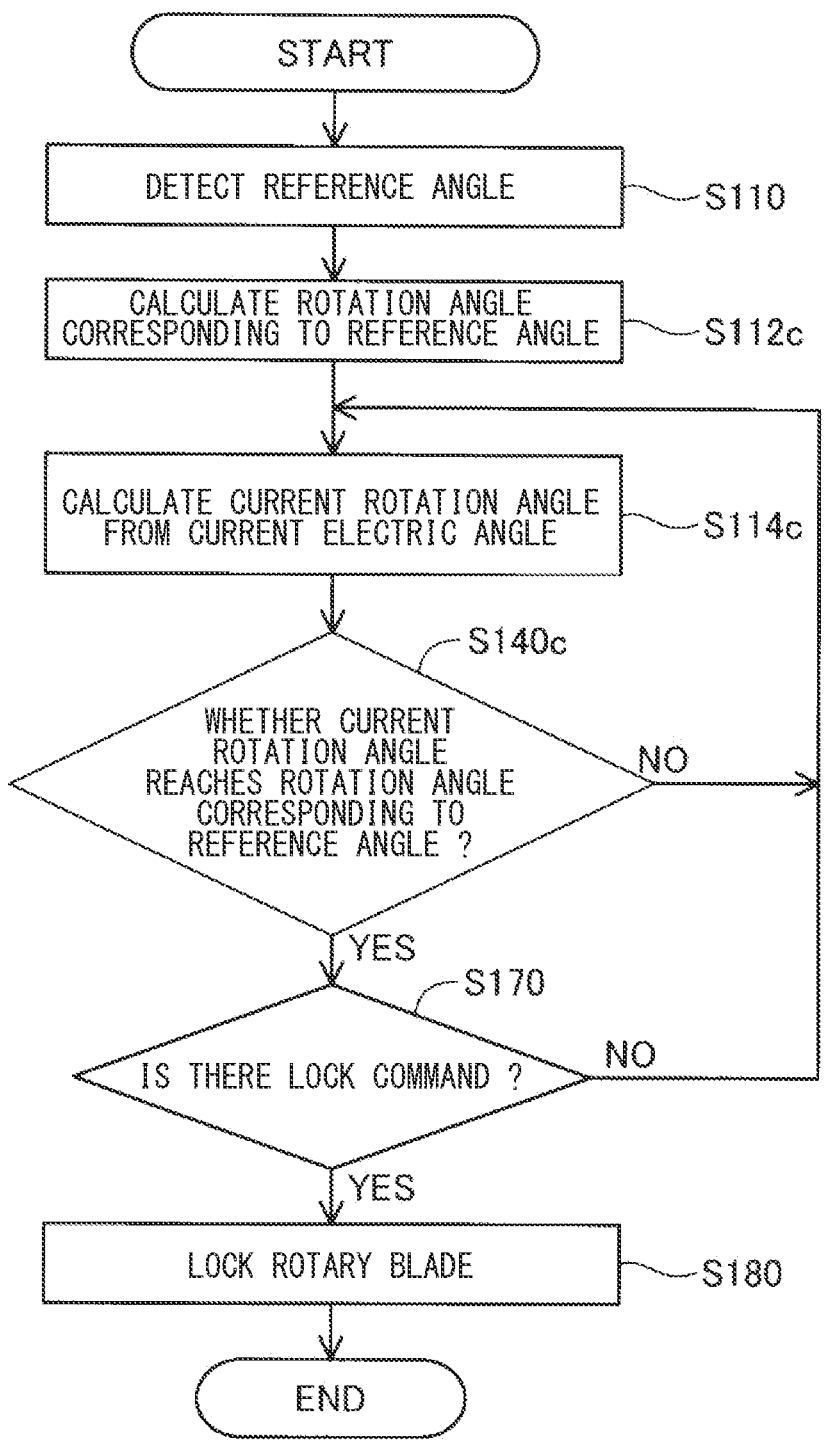
FIG. 13 is a flowchart showing a procedure of lock processing in a fourth embodiment.
Figure 14:
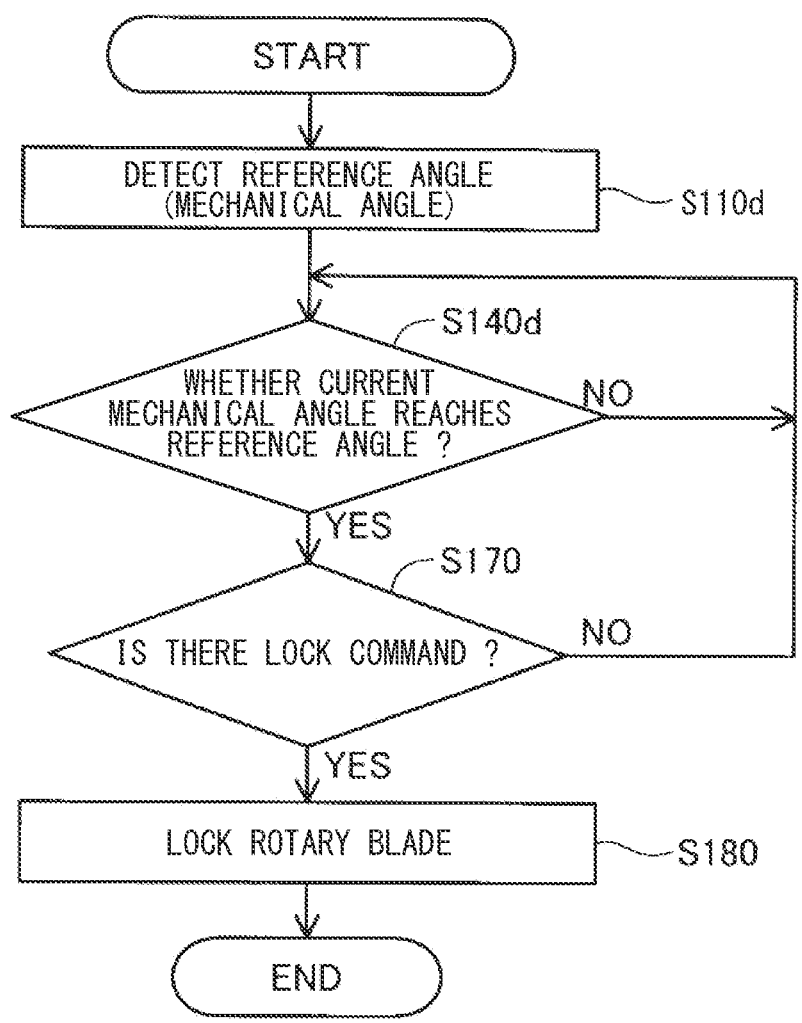
FIG. 14 is a flowchart showing a procedure of lock processing in a fifth embodiment.

In the EDS 10 on which the control device 50 of a fourth embodiment is mounted, the output of the motor 11 is transmitted to the rotary blade 30 via the gear G, and in this respect, the EDS 10 of the fourth embodiment is different from the EDS 10 of the third embodiment. Along with this difference, the lock processing of the fourth embodiment shown in FIG. 13 is different from the lock processing of the third embodiment in that steps S112c, S114c and S140c are executed instead of steps S112b, S114b and S140b. Since the other configurations are the same as those in the third embodiment, the same configurations are designated by the same reference numerals, and detailed description thereof will be omitted.

After executing step S110, the lock control unit 52 calculates the rotation angle of the rotary blade 30 corresponding to the reference angle detected in step S110 (step S112c). The rotation angle is calculated by dividing the detected reference angle by the number of pole pairs of the motor 11 and multiplying the divided value by the gear ratio of the gear G.

The lock control unit 52 calculates the current rotation angle of the rotary blade 30 from the current electric angle of the motor 11 (step S114c). The current rotation angle of the rotary blade 30 is calculated by dividing the current electric angle of the motor 11 by the number of pole pairs of the motor 11 and multiplying the divided value by the gear ratio of the gear G. The lock control unit 52 specifies whether or not the current rotation angle of the rotary blade 30 calculated in step S114c has reached the rotation angle of the rotary blade 30 corresponding to the reference angle of the motor 11 calculated in step S112c (step S140c). When it is specified that the current rotation angle of the rotary blade 30 has not reached the rotation angle corresponding to the reference angle (step S140c: NO), the process returns to step S114c. On the other hand, when it is specified that the current rotation angle of the rotary blade 30 has reached the rotation angle corresponding to the reference angle (step S140c: YES), the lock control unit 52 determines whether or not there is a lock command from the flight control system 40 (step S170). If it is determined that there is no lock command (step S170: NO), the process returns to step S114c. On the other hand, when it is determined that there is the lock command (step S170: YES), the rotation of the rotary blade 30 is locked by locking the rotation of the motor 11 (step S180). In step S180, the rotation of the motor 11 is locked as a target when the current rotation angle of the rotary blade 30 reaches the rotation angle of the rotary blade 30 at the reference angle and the rotation of the rotary blade 30 is locked. Execution of step S180 ends the lock processing.

According to the control device 50 of the EDS 10 in the fourth embodiment described above, the same effect as that in the third embodiment is obtained. In addition, even in a configuration in which the output of the motor 11 is transmitted to the rotary blade 30 via the gear G, the rotation of the rotary blade 30 can be locked within the lock angle range.

E. Fifth Embodiment

In the control device 50 of a fifth embodiment, the angle acquisition unit 53 acquires the mechanical angle of the motor 11 using the value measured by the angle sensor 13 provided in the motor 11, and the reference angle storage unit 54 stores the reference angle, which is the angle corresponding to the target lock position as the value of the mechanical angle of the motor 11. In this respect, the control device 50 of the fifth embodiment differs from the control device 50 of the third embodiment. Along with this difference, the lock processing of the fifth embodiment is different from the lock processing of the third embodiment in that steps S112b and S114b are omitted and step S140d is executed instead of step S140b. Since the other configurations are the same as those in the third embodiment, the same configurations are designated by the same reference numerals, and detailed description thereof will be omitted. In the present embodiment, the output of the motor 11 is transmitted to the rotary blade 30 without going through a gear.

The lock control unit 52 detects a reference angle, that is, an angle corresponding to a target lock position when the rotary blade 30 is locked in the lock angle range (step S110). In the present embodiment, the reference angle is stored in the reference angle storage unit 54 as the value of the mechanical angle of the motor 11 when the rotation of the rotary blade 30 is locked last time. The reference angle may be stored in the reference angle storage unit 54 as the value of the mechanical angle when the start switch of the eVTOL 100 is turned on.

The lock control unit 52 specifies whether or not the current mechanical angle of the motor 11 has reached the reference angle (step S140d). The current mechanical angle of the motor 11 is measured by the angle sensor 13 provided in the motor 11 and acquired by the angle acquisition unit 53. When it is specified that the current mechanical angle of the motor 11 has not reached the reference angle (step S140d: NO), the lock control unit 52 repeats step S140d. On the other hand, when it is specified that the current mechanical angle of the motor 11 has reached the reference angle (step S140d: YES), the lock control unit 52 determines whether or not there is a lock command from the flight control system 40 (step S170). If it is determined that there is no lock command (step S170: NO), the process returns to step S114d. On the other hand, when it is determined that there is the lock command (step S170: YES), the rotation of the rotary blade 30 is locked by locking the rotation of the motor 11 (step S180). In step S180, the rotation of the motor 11 is locked as a target when the current mechanical angle of the motor 11 reaches the stored reference angle and the rotation of the rotary blade 30 is locked.

According to the control device 50 of the EDS 10 in the fifth embodiment described above, the same effect as that in the third embodiment is obtained. In addition, the angle sensor 13 for detecting the mechanical angle of the motor 11 is provided in the motor 11, and the rotation of the rotary blade 30 is locked as a target when the current mechanical angle of the motor 11 reaches the stored reference angle. Therefore, it is possible to omit the calculation of the machine angle.

F. Sixth Embodiment

In the EDS 10 on which the control device 50 of the sixth embodiment is mounted, the output of the motor 11 is transmitted to the rotary blade 30 via the gear G, the rotary blade 30 is provided with an angle sensor so that the angle acquisition unit 53 acquires the rotation angle of the rotary blade 30, and the reference angle storage unit 54 store the reference angle, which is an angle corresponding to the target lock position, as the value of the rotation angle of the rotary blade 30. In this respect, the EDS10 of the sixth embodiment is different from the EDS10 of the fifth embodiment. Along with this difference, the lock processing of the sixth embodiment is different from the lock processing of the fifth embodiment in that steps S110e and S140e are executed instead of steps S110 and S140d. Since the other configurations are the same as those in the fifth embodiment, the same configurations are designated by the same reference numerals, and detailed description thereof will be omitted.

Figure 15:
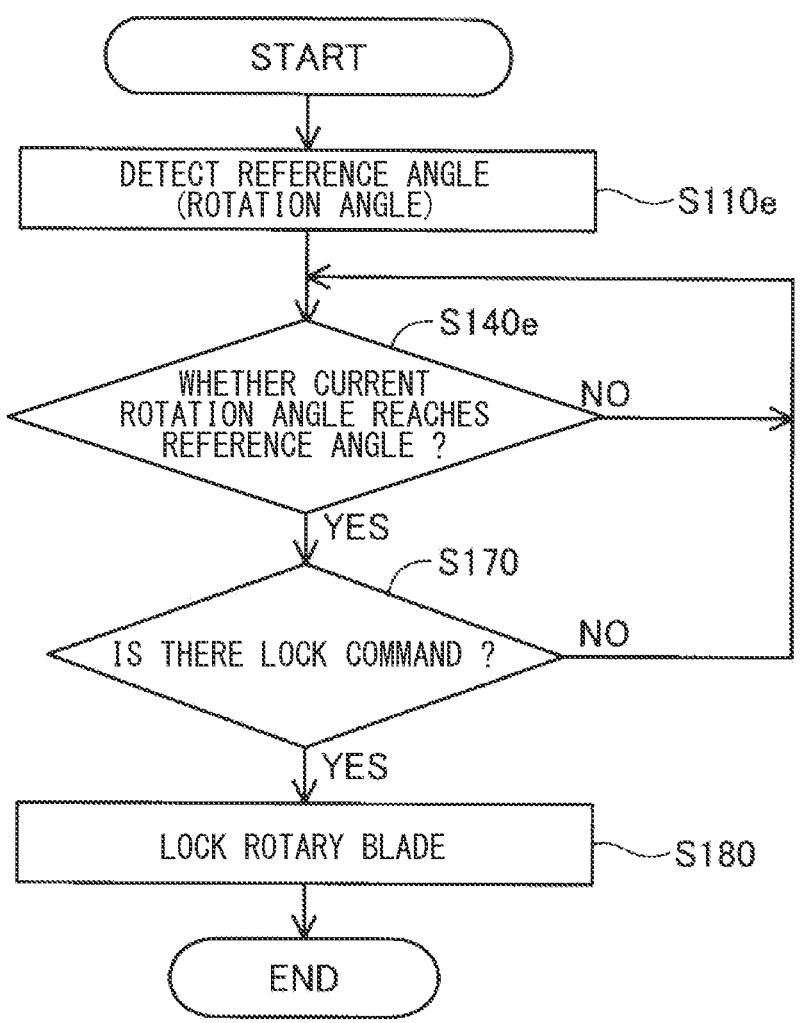
FIG. 15 is a flowchart showing a procedure of lock processing in a sixth embodiment.

In step S110e shown in FIG. 15, the lock control unit 52 detects a reference angle, that is, an angle corresponding to a target lock position when the rotary blade 30 is locked in the lock angle range (step S110). In the present embodiment, the reference angle is stored in the reference angle storage unit 54 as the value of the rotation angle of the rotary blade 30 when the rotation of the rotary blade 30 is locked last time. Such a reference angle may be stored in the reference angle storage unit 54 as a value of the rotation angle of the rotary blade 30 when the start switch of the eVTOL 100 is turned on.

The lock control unit 52 specifies whether or not the current rotation angle of the rotary blade 30 has reached the reference angle (step S140e). The current rotation angle of the rotary blade 30 is measured by the angle sensor provided in the motor 11 and acquired by the angle acquisition unit 53. When it is specified that the current rotation angle of the rotary blade 30 has not reached the reference angle (step S140e: NO), the lock control unit 52 repeats step S140e. On the other hand, when it is specified that the current rotation angle of the rotary blade 30 has reached the reference angle (step S140e: YES), the lock control unit 52 determines whether or not there is a lock command from the flight control system 40 (step S170). If it is determined that there is no lock command (step S170: NO), the process returns to step S114e. On the other hand, when it is determined that there is the lock command (step S170: YES), the rotation of the rotary blade 30 is locked by locking the rotation of the motor 11 (step S180). In step S180, the rotation of the motor 11 is locked as a target when the current rotation angle of the rotary blade 30 reaches the stored reference angle and the rotation of the rotary blade 30 is locked.

According to the control device 50 of the EDS 10 in the sixth embodiment described above, the same effect as that in the fifth embodiment is obtained. In addition, the angle sensor for detecting the rotation angle of the rotary blade 30 is provided on the rotary blade 30, and the rotation of the rotary blade 30 is locked as a target when the current rotation angle of the rotary blade 30 reaches the stored reference angle. Therefore, even in a configuration in which the output of the motor 11 is transmitted to the rotary blade 30 via the gear G, the rotation of the rotary blade 30 can be locked within the lock angle range.

G. Seventh Embodiment

Figure 16:
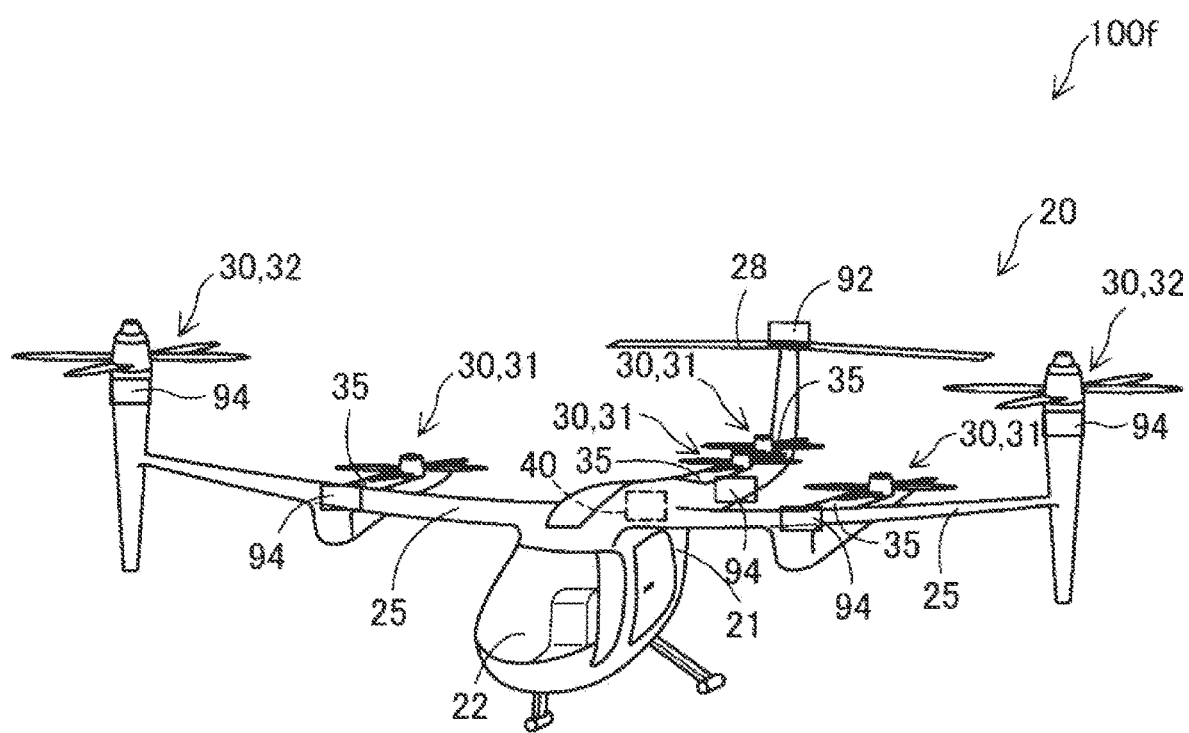
FIG. 16 is a perspective view showing a schematic configuration of an electric vertical take-off and landing vehicle according to a seventh embodiment.
Figure 17:
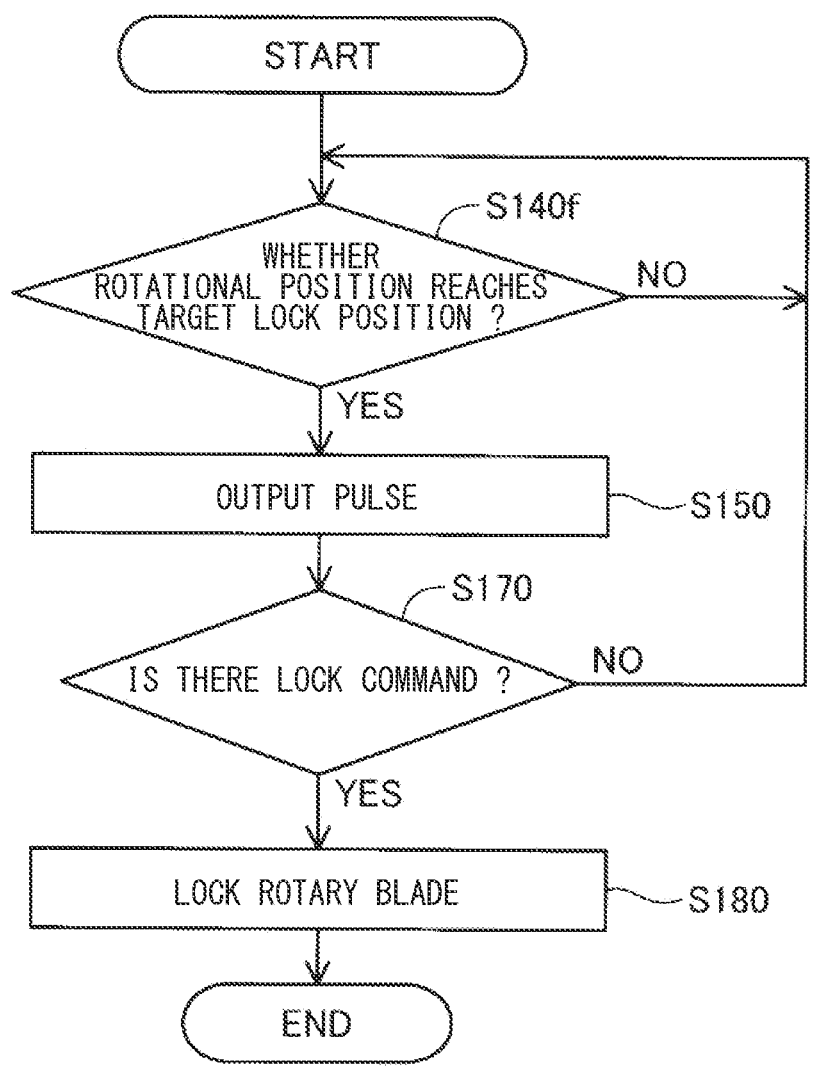
FIG. 17 is a flowchart showing a procedure of lock processing in the seventh embodiment.

As shown in FIG. 16, the EDS 10 of a seventh embodiment is mounted on the eVTOL 100f. The eVTOL 100f is different from the eVTOL 100 of the first embodiment in that it further has a detection unit for detecting the rotational position of the rotary blade 30. Along with this difference, the lock processing of the seventh embodiment shown in FIG. 17 is different from the lock processing of the first embodiment in that steps S110 to S130 and S160 are omitted and step S140f is executed instead of step S140. Since the other configurations are the same as those in the first embodiment, the same configurations are designated by the same reference numerals, and detailed description thereof will be omitted. In the present embodiment, the output of the motor 11 is transmitted to the rotary blade 30 without the gear, but may be transmitted to the rotary blade 30 via the gear.

The eVTOL 100f of the seventh embodiment is provided with a visual servo 92 and an infrared sensor 94 as a detection unit for detecting the rotational position of the rotary blade 30. The visual servo 92 is composed of, for example, a camera provided on the tail wing 28, and detects the rotational position of each rotary blade 30. The infrared sensor 94 is provided, for example, vertically below each rotary blade 30, and detects the rotational position of each rotary blade 30. Either one of the visual servo 92 and the infrared sensor 94 may be omitted, and instead of the infrared sensor 94 or in addition to the infrared sensor 94, any detection unit capable of detecting the rotational position of the rotary blade 30 such as an ultrasonic sensor, a position sensor, an optical sensor, a photoelectric sensor, or the like may be provided.

Figure 18:
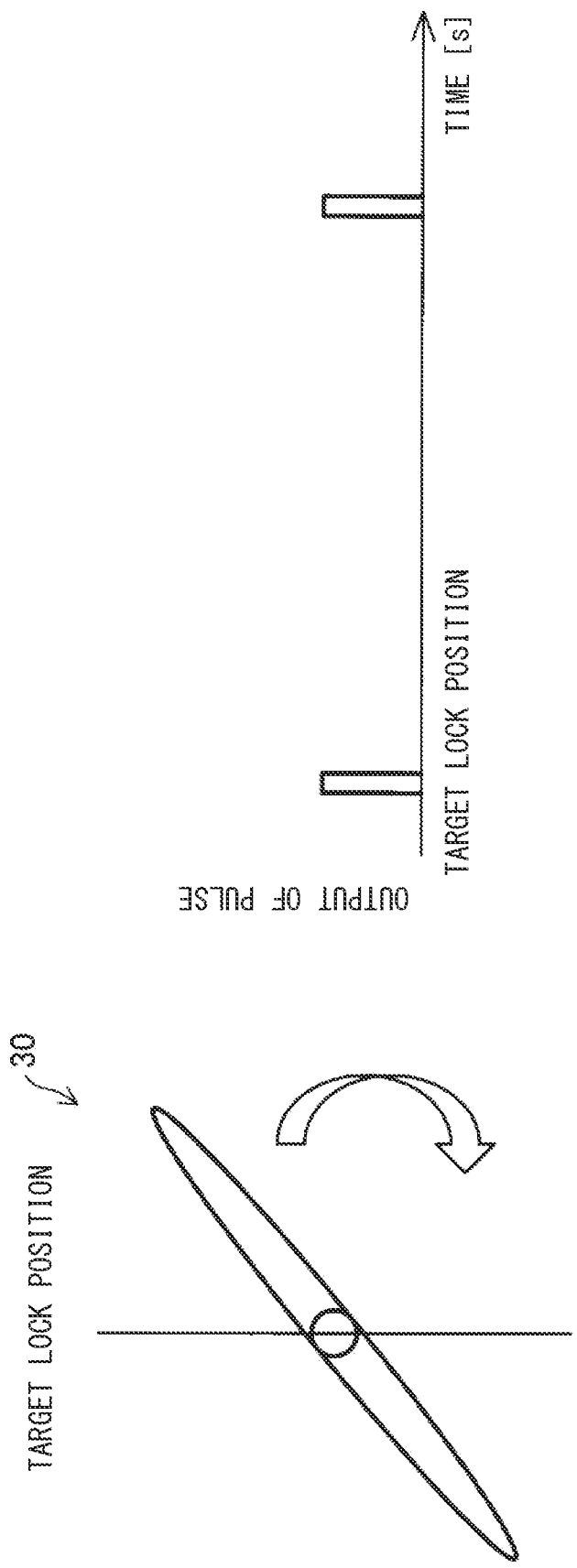
FIG. 18 is an explanatory diagram showing how a pulse is output at a target lock position.

As shown in FIG. 18, in the pulse output unit 55 included in the EDS 10 of the seventh embodiment, based on the detection results of the visual servo 92 and the infrared sensor 94, a pulse is output when the current rotational position of the rotary blade 30 coincides with the target lock position for locking the rotary blade 30 within the lock angle range. With such a configuration, the pulse output unit 55 outputs a pulse every time the rotary blade 30 makes one rotation.

As shown in FIG. 17, the lock control unit 52 specifies whether or not the current rotational position of the rotary blade 30 detected by the visual servo 92 and the infrared sensor 94 has reached the target lock position (step S140f). When it is specified that the current rotational position of the rotary blade 30 has not reached the target lock position (step S140f: NO), the lock control unit 52 repeats step S140f. On the other hand, when it is specified that the current rotational position of the rotary blade 30 has reached the target lock position (step S140f: YES), the lock control unit 52 determines whether or not there is a lock command from the flight control system 40 (step S170). If it is determined that there is no lock command (step S170: NO), the process returns to step S114f. On the other hand, when it is determined that there is the lock command (step S170: YES), the rotation of the rotary blade 30 is locked by locking the rotation of the motor 11 (step S180). In step S180, the lock control unit 52 locks the rotary blade 30 as the target when the pulse output unit 55 outputs a pulse. Execution of step S180 ends the lock processing.

According to the control device 50 of the EDS 10 in the seventh embodiment described above, the same effect as that in the first embodiment is obtained. In addition, the detection unit that detects the rotational position of the rotary blade 30 is provided in the eVTOL 100f, and the pulse output unit 55 outputs the pulse when the target lock position for locking the rotary blade 30 within the lock angle range coincides with the current rotational position of the rotary blade 30. Therefore, the detection of the electric angle, the calculation of the mechanical angle, and the like can be omitted, and the reference angle storage unit 54 can be omitted. In addition, even in a configuration in which the output of the motor 11 is transmitted to the rotary blade 30 via the gear G, the rotation of the rotary blade 30 can be locked within the lock angle range.

H. Other Embodiments

H-1. Other Embodiment 1

In each of the above embodiments, each rotary blade 30 has two blades 33, but the rotary blades 30 are not limited to two, and may have an arbitrary number of blades 33 such as one or three. In a configuration having one blade 33, when the number of blades 33 of the rotary blade 30 is A and the target lock position is B, the lock angle range may be set to an angle range of [B−45 deg] or more and [B+45 deg] or less. According to such an embodiment, it is possible to further suppress that the angle at which the rotary blade 30 is locked deviates significantly from the target lock position.

H-2. Other Embodiment 2

In each of the above embodiments, the control device 50 is mounted on each EDS 10, but even if one control device 50 of the EDS 10 is provided on the eVTOL 100 and 100f and the control device 50 controls a plurality of EDSs 10. In such a configuration, the lock control unit 52 may specify the rotary blade 30 to be locked among the plurality of rotary blades 30 according to the operation modes of the eVTOL 100 and 100f. For example, when the operation mode of the eVTOL 100, 100f is the cruising mode, the lift rotary blade 31 may be specified as the locking rotary blade 30. According to such an embodiment, it is possible to appropriately lock the rotary blade 30 which is not rotationally driven among the plurality of rotary blades 30 according to the operation mode of the eVTOL 100, 100f.

H-3. Other Embodiment 3

The EDS 10 of each of the above embodiments has a motor 11 for rotationally driving the rotary blade 30, but the EDS 10 may not include the motor 11. That is, the EDS 10 may be a system for controlling the motor 11 provided outside the EDS 10. Even with such a configuration, the same effect as that of each of the above embodiments can be obtained.

H-4. Other Embodiment 4

The configurations of eVTOL 100, 100f in each of the above embodiments are merely examples and can be changed in various ways. For example, in each of the above embodiments, the eVTOL 100, 100f includes the rotor 32 having a variable tilt angle, but instead of the tilt rotor 32 or in addition to the tilt rotor 32, a cruise rotor with a fixed tilt angle may be provided as the rotary blade 30. Further, for example, the tilt rotor 32 may be provided with an accommodating portion, and the tilt rotor 32 that is not rotationally driven may be accommodated in the accommodating portion. In such an embodiment, the tilt rotor 32 may be stopped and locked at an angle that allows it to be accommodated in the accommodating portion. Further, for example, the accommodating portion of the lift rotary blade 31 may be omitted. In such an embodiment, the lift rotary blade 31 may be stopped and locked at an angle such that the value of air resistance becomes small. Even with such a configuration, the same effect as that of each of the above described embodiments can be obtained.

H-5. Other Embodiment 5

The EDS10 of each of the above embodiments has been mounted on the eVTOL 100, 100f, but is not limited to be mounted on the eVTOL 100, 100f and may be mounted on any manned or unmanned electric aircraft. It is not limited to be mounted on the electric aircraft, and may be mounted on an electric moving body such as a ship or a submersible that is remotely controlled by radio, or any ship that is rotationally driven by a screw. That is, in general, the control device 50 of the EDS 10 may be configured to rotationally drive one of the rotary blades 30 and the screw that are the rotating body. Further, the lock angle range may be an angle range in which the resistance value is smaller than the intermediate value between the maximum value and the minimum value of the resistance value that the rotating body receives from the external fluid according to the lock position of the rotating body. Even with such a configuration, the same effect as that of each of the above embodiments can be obtained.

H-6. Other Embodiment 6

In the eVTOL 100 of the first to sixth embodiments, an arbitrary detection unit capable of detecting the rotational position of the rotary blade 30 may be provided in the eVTOL 100f as in the case of the eVTOL 100f of the seventh embodiment, and the rotary blade 30 may be locked at the target lock position by cooperating with such a detection unit. According to such a configuration, the accuracy when locking the rotary blade 30 in the lock angle range can be improved.

The present disclosure should not be limited to the embodiments described above, and various other embodiments may be implemented without departing from the scope of the present disclosure. For example, the technical features in each embodiment corresponding to the technical features in the form described in the summary may be used to solve some or all of the above-described problems, or to provide one of the above-described effects. In order to achieve a part or all, replacement or combination can be appropriately performed. Also, if the technical features are not described as essential in the present specification, they can be deleted as appropriate.

The control device, the external device, and the technique according to the present disclosure may be achieved by a dedicated computer provided by constituting a processor and a memory programmed to execute one or more functions embodied by a computer program. Alternatively, the controller and the method described in the present disclosure may be implemented by a special purpose computer configured as a processor with one or more special purpose hardware logic circuits. Alternatively, the control device, the external device, and the technique according to the present disclosure may be achieved using one or more dedicated computers constituted by a combination of the processor and the memory programmed to execute one or more functions and the processor with one or more hardware logic circuits. The computer programs may be stored, as instructions to be executed by a computer, in a tangible non-transitory computer-readable medium.

What is claimed is:

1. An electric vertical take-off and landing aircraft comprising:
   an airframe;
   a plurality of rotary blades;
   a plurality of electric drive systems respectively corresponding to the plurality of rotary blades for rotationally driving each of the plurality of rotary blades, a subset of the plurality of electric drive systems rotating and driving at least one lift rotary blade for obtaining lift of the airframe, and another subset of the plurality of electric drive systems rotating at least one tilt rotor with a variable tilt angle; and
   a flight control system, wherein:
   each electric drive system of the plurality of electric drive systems includes:
     an inverter circuit;
     a motor that (i) outputs torque corresponding to voltage and current supplied from the inverter circuit and (ii) drives the rotary blade corresponding to the electric drive system to rotate via a shaft; and
     a control device;
   the flight control system is configured to output, to the control device of each of the plurality of electric drive systems, a lock command for stopping and locking rotation of a rotary blade that is not driven to rotate,
     the lock command being output to the control device of the electric drive system corresponding to the lift rotary blade when an operation mode of the electric vertical take-off and landing aircraft is a first mode, and
     the lock command being output to the control device of the electric drive system corresponding to the tilt rotor when an operation mode of the electric vertical take-off and landing aircraft is a second mode; and
   the control device of each electric drive system includes:
     a processor programmed to:
       acquire a rotation angle of the corresponding rotary blade; and
       perform control to lock the corresponding motor so as to lock a rotation of the corresponding rotary blade within a set lock angle range based on the acquired rotation angle by gradually reducing a rotation speed of the corresponding rotary blade and locking the rotation of the corresponding rotary blade after the rotation speed becomes equal to or less than a predetermined rotation speed; and
     a memory configured to store a reference angle for locking the corresponding rotary blade within the lock angle range as (i) a value of an electric angle of the corresponding motor when the rotation of the corresponding rotary blade was last locked or (ii) as a value of the electric angle of the corresponding motor when a start switch of the electric vertical take-off and landing aircraft is turned on.

2. The electric vertical take-off and landing aircraft according to claim 1, wherein
   the lock angle range is an angle range in which a resistance value is smaller than an intermediate value between a maximum value and a minimum value of the resistance value that the corresponding rotary blade receives from an external fluid according to a lock position of the corresponding rotary blade.

3. The electric vertical take-off and landing aircraft according to claim 1, wherein
the plurality of electric drive systems are mounted on the airframe of the aircraft,
the lift rotary blade is housed in an accommodating portion provided in the airframe in a state where the lift rotary blade is not rotationally driven, and
the lock angle range is included in an accommodation angle range, which is an angle range in which the lift rotary blade can be housed in the accommodating portion.

4. The electric vertical take-off and landing aircraft according to claim 1, wherein
each of the plurality of rotary blades has blades formed symmetrically about a rotation axis along a direction perpendicular to the rotation axis, and
the lock angle range is [B−2π/A] or more [B+2π/A] or less when a number of blades is A, a target lock position is B, and 180 deg is π.

5. An electric vertical take-off and landing aircraft comprising:
an airframe;
a plurality of rotary blades;
a plurality of electric drive systems respectively corresponding to the plurality of rotary blades for rotationally driving each of the plurality of rotary blades, a subset of the plurality of electric drive systems rotating and driving at least one lift rotary blade for obtaining lift of the airframe, and another subset of the plurality of electric drive systems rotating at least one tilt rotor with a variable tilt angle; and
a flight control system, wherein:
each electric drive system of the plurality of electric drive systems includes:
an inverter circuit;
a motor that (i) outputs torque corresponding to voltage and current supplied from the inverter circuit and (ii) drives the rotary blade corresponding to the electric drive system to rotate via a shaft; and
a control device;
the flight control system is configured to output, to the control device of each of the plurality of electric drive systems, a lock command for stopping and locking rotation of a rotary blade that is not driven to rotate,
the lock command being output to the control device of the electric drive system corresponding to the lift rotary blade when an operation mode of the electric vertical take-off and landing aircraft is a first mode, and
the lock command being output to the control device of the electric drive system corresponding to the tilt rotor when an operation mode of the electric vertical take-off and landing aircraft is a second mode; and
the control device of each electric drive system includes:
a processor programmed to:
acquire a rotation angle of the corresponding rotary blade, which is provided with an angle sensor that detects the rotation angle;
perform control to lock the corresponding motor so as to lock a rotation of the corresponding rotary blade within a set lock angle range based on the acquired rotation angle by gradually reducing a rotation speed of the corresponding rotary blade and locking the rotation of the corresponding rotary blade after the rotation speed becomes equal to or less than a predetermined rotation speed; and
perform control to lock the corresponding rotary blade as a target when a current rotation angle of the corresponding rotary blade reaches a stored reference angle, the reference angle being stored (i) when the rotation of the rotary blade was last locked or (ii) when a start switch of the electric vertical take-off and landing aircraft is turned on; and
a memory configured to store the reference angle for locking the corresponding rotary blade within the lock angle range as a value of an electric angle of the corresponding motor.

* * * * *